(12) United States Patent
Case, Jr.

(10) Patent No.: US 9,259,613 B2
(45) Date of Patent: Feb. 16, 2016

(54) SYSTEMS FOR ACTIVATING ELECTRONIC DEVICES FOR OPERATION WITH ATHLETIC EQUIPMENT

(71) Applicant: NIKE, Inc., Beaverton, OR (US)

(72) Inventor: Charles W. Case, Jr., Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 80 days.

(21) Appl. No.: 13/707,018

(22) Filed: Dec. 6, 2012

(65) Prior Publication Data

US 2013/0096704 A1    Apr. 18, 2013

Related U.S. Application Data

(63) Continuation of application No. 13/454,895, filed on Apr. 24, 2012, now Pat. No. 8,350,708, which is a continuation of application No. 11/407,328, filed on Apr. 20, 2006, now Pat. No. 8,188,868.

(51) Int. Cl.
*A63F 9/24*    (2006.01)
*A63B 24/00*   (2006.01)
(Continued)

(52) U.S. Cl.
CPC ........... *A63B 24/0062* (2013.01); *A43B 3/0005* (2013.01); *A63B 53/00* (2013.01);
(Continued)

(58) Field of Classification Search
CPC ............. A63F 9/18; A63F 9/00; A63F 67/00; A63F 71/00
USPC ...................................... 463/1, 47
See application file for complete search history.

(56) References Cited

U.S. PATENT DOCUMENTS 4,350,853 A    9/1982 Gaynard
4,780,864 A *  10/1988 Houlihan ........................ 368/10
(Continued)

FOREIGN PATENT DOCUMENTS

EP    0 589 607 A1    9/1993
EP    1 552 761 A1    7/2005
(Continued)

OTHER PUBLICATIONS

Office Action received in related Japanese application, Application No. 2009-506570, mailed Jul. 20, 2011.
(Continued)

*Primary Examiner* — Reginald Renwick
(74) *Attorney, Agent, or Firm* — Banner & Witcoff, Ltd.

(57) ABSTRACT

Articles of clothing or pieces of athletic equipment include modules, e.g., for sensing physical and/or physiological characteristics associated with use of the clothing or athletic equipment or for performing other functions. Such systems and methods may use physical or other interaction(s) between the module and the article of clothing or piece of athletic equipment for activating and/or deactivating the module and/or sensing devices included with the module, for confirming whether the module and clothing or piece of athletic equipment are authorized for use with one another, and/or for automatic data algorithm selection methods. Additionally, such systems and methods also may use the activation and/or authentication systems for data input to the module. Some examples of such systems and methods may utilize magnets and magnetic sensing systems and/or light (or other radiation) sources and sensing systems for activation, authentication, data input, and/or algorithm selection.

27 Claims, 10 Drawing Sheets

(51) Int. Cl.
*G06F 17/40* (2006.01)
*G08C 17/02* (2006.01)
*A43B 3/00* (2006.01)
*A63B 53/00* (2015.01)
*A63B 71/06* (2006.01)
*A41D 1/00* (2006.01)

(52) U.S. Cl.
CPC .............. *A63B 71/06* (2013.01); *G06F 17/40* (2013.01); *G08C 17/02* (2013.01); *A41D 1/002* (2013.01); *A63C 2203/18* (2013.01); *A63C 2203/22* (2013.01); *A63C 2203/24* (2013.01)

(56) References Cited

U.S. PATENT DOCUMENTS

| | | | |
|---|---|---|---|
| 4,991,850 A * | 2/1991 | Wilhlem | 473/233 |
| 5,170,161 A * | 12/1992 | Sakurai | 340/870.3 |
| 5,285,586 A | 2/1994 | Goldston et al. | |
| 5,335,188 A | 8/1994 | Brisson | |
| 5,422,628 A | 6/1995 | Rodgers | |
| 5,596,652 A | 1/1997 | Piatek et al. | |
| 5,598,849 A | 2/1997 | Browne | |
| 5,692,324 A | 12/1997 | Goldston et al. | |
| 5,724,265 A | 3/1998 | Hutchings | |
| 5,761,157 A * | 6/1998 | Takeda et al. | 368/10 |
| 5,793,882 A | 8/1998 | Piatek et al. | |
| 5,890,997 A | 4/1999 | Roth | |
| 5,931,763 A | 8/1999 | Alessandri | |
| 5,955,667 A | 9/1999 | Fyfe | |
| 6,000,149 A | 12/1999 | Pomerantz | |
| 6,012,822 A | 1/2000 | Robinson | |
| 6,013,007 A | 1/2000 | Root et al. | |
| 6,018,705 A | 1/2000 | Gaudet et al. | |
| 6,030,089 A | 2/2000 | Parker et al. | |
| 6,052,654 A | 4/2000 | Gaudet et al. | |
| 6,077,193 A | 6/2000 | Buhler et al. | |
| 6,375,612 B1 | 4/2002 | Guichon et al. | |
| 6,396,413 B2 | 5/2002 | Hines et al. | |
| 6,424,264 B1 | 7/2002 | Giraldin et al. | |
| 6,430,843 B1 | 8/2002 | Potter et al. | |
| 6,526,158 B1 | 2/2003 | Goldberg | |
| 6,531,963 B1 | 3/2003 | Nyfelt | |
| 6,563,424 B1 | 5/2003 | Kaario | |
| 6,569,092 B1 | 5/2003 | Guichon et al. | |
| 6,600,407 B2 | 7/2003 | Paek | |
| 6,614,392 B2 | 9/2003 | Howard | |
| 6,788,200 B1 | 9/2004 | Jamel et al. | |
| 6,865,825 B2 | 3/2005 | Bailey, Sr. et al. | |
| 6,876,947 B1 | 4/2005 | Darley et al. | |
| 6,882,955 B1 | 4/2005 | Ohlenbusch et al. | |
| 7,219,449 B1 | 5/2007 | Hoffberg et al. | |
| 7,980,009 B2 | 7/2011 | Carnes et al. | |
| 2001/0054014 A1 | 12/2001 | Noda et al. | |
| 2002/0022551 A1 | 2/2002 | Watterson et al. | |
| 2002/0077883 A1 | 6/2002 | Lancos et al. | |
| 2002/0080198 A1 | 6/2002 | Giraldin et al. | |
| 2002/0091796 A1 | 7/2002 | Higginson et al. | |
| 2002/0142887 A1 | 10/2002 | O'Malley | |
| 2002/0147629 A1 | 10/2002 | Alsafadi et al. | |
| 2002/0147642 A1 | 10/2002 | Avallone et al. | |
| 2002/0156677 A1 | 10/2002 | Peters et al. | |
| 2002/0165758 A1 | 11/2002 | Hind et al. | |
| 2002/0173407 A1 | 11/2002 | Bowman | |
| 2002/0174025 A1 | 11/2002 | Hind et al. | |
| 2003/0009308 A1 | 1/2003 | Kirtley | |
| 2003/0009382 A1 | 1/2003 | D'Arbeloff et al. | |
| 2003/0009913 A1 | 1/2003 | Potter et al. | |
| 2003/0040922 A1 | 2/2003 | Bodin | |
| 2003/0090386 A1 | 5/2003 | Giraldin et al. | |
| 2003/0108217 A1 | 6/2003 | Tilbury et al. | |
| 2003/0160732 A1 | 8/2003 | Van Heerden et al. | |
| 2003/0163287 A1 | 8/2003 | Vock et al. | |
| 2004/0009731 A1 | 1/2004 | Rabinowicz | |
| 2004/0177531 A1 | 9/2004 | DiBenedetto et al. | |
| 2004/0254650 A1 * | 12/2004 | Campagnolo et al. | 700/2 |
| 2005/0055850 A1 | 3/2005 | Ein-Gal | |
| 2005/0261559 A1 | 11/2005 | Mumford et al. | |
| 2009/0088608 A1 | 4/2009 | Mumford et al. | |
| 2009/0308179 A1 * | 12/2009 | Wyatt et al. | 73/862.391 |

FOREIGN PATENT DOCUMENTS

| | | |
|---|---|---|
| GB | 2 121 219 | 12/1983 |
| JP | 05-161724 | 6/1993 |
| JP | 10127302 | 5/1998 |
| JP | 2000-316833 | 11/2000 |
| JP | 2001-155121 | 6/2001 |
| JP | 2002-507734 | 3/2002 |
| JP | 2002-253301 | 9/2002 |
| JP | 2002302811 | 10/2002 |
| JP | 2003-258993 A | 9/2003 |
| JP | 2003-307431 | 10/2003 |
| JP | 2003-530913 | 10/2003 |
| JP | 2003-316483 | 11/2003 |
| JP | 2004-503684 | 2/2004 |
| JP | 2004-503685 | 2/2004 |
| JP | 2004-312477 | 11/2004 |
| JP | 2004-313407 | 11/2004 |
| JP | 2005-506674 | 3/2005 |
| JP | 2005-146499 | 6/2005 |
| JP | 2006-094955 | 10/2006 |
| WO | 97/21983 | 6/1997 |
| WO | 99/49279 | 9/1999 |
| WO | 01/69179 | 9/2001 |
| WO | 01/78539 | 10/2001 |
| WO | 02102240 | 12/2002 |
| WO | 2004/110192 A1 | 12/2004 |
| WO | 2007001809 A2 | 1/2007 |

OTHER PUBLICATIONS

International Search Report in corresponding PCT Application, International Application No. PCT/US2007/009524, mailed Nov. 15, 2007.
International Preliminary Report on Patentability in corresponding PCT Application, International Application No. PCT/US2007/009524, mailed Oct. 30, 2008.
Office Action received in related Japanese application, Application No. 2009-506570, mailed Nov. 7, 2011.
Office Action in corresponding European Application, Application No. 07 755 699.1, issued Aug. 12, 2011.
Office Action in corresponding European Application, Application No. 07 755 699.1, issued Dec. 28, 2011.
First Office Action in corresponding Chinese Application, Application No. 2007800185330, issued Jul. 2, 2010.
European Patent Application No. 13180919.6 Extended European Search Report dated Nov. 20, 2013.
Japanese Patent Application No. 2011-104335 Notice of Reasons for Rejection dated Feb. 8, 2013 including English translation.
Japanese Patent Application No. 2012-032567 Notice of Reasons for Rejection dated Aug. 14, 2013 including English translation.
European Patent Application No. 12198781.2 Extended European Search Report dated Aug. 29, 2013.
European Patent Application No. 13180939.4 Partial European Search Report dated Dec. 10, 2013.

* cited by examiner

SYSTEMS FOR ACTIVATING ELECTRONIC DEVICES FOR OPERATION WITH ATHLETIC EQUIPMENT

RELATED APPLICATION DATA

This application is a continuation of U.S. patent application Ser. No. 13/454,895 filed Apr. 24, 2012 and entitled "System for Activating and/or Authenticating Electronic Devices for Operation with Athletic Equipment," in the name of Charles Whipple Case, Jr., which application is a continuation of U.S. patent application Ser. No. 11/407,328 filed Apr. 20, 2006 and entitled "Systems for Activating and/or Authenticating Electronic Devices for Operation with Apparel and Equipment," in the name of Charles Whipple Case, Jr., now U.S. Pat. No. 8,188,868. Each of these priority applications is entirely incorporated herein by reference.

FIELD OF THE INVENTION

This invention relates generally to apparel and equipment (e.g., athletic apparel and athletic equipment) that may be used with and/or include one or more electronic modules. At least some example aspects of this invention utilize physical and/or other interactions (e.g., interactions between magnet sources or light sources with appropriate sensors) between the module and the article of apparel or equipment to which it is attached (and/or an absence of and/or change in such interactions) for providing module activation/authentication information and/or data processing algorithm selection information. Additional example aspects of the invention involve data input systems for electronic modules.

Features and aspects of this invention also may be used in conjunction with the systems and methods described in commonly owned U.S. patent application Ser. No. 11/166,351 filed Jun. 27, 2005, which application is entirely incorporated herein by reference.

BACKGROUND

Athletes at all levels of competition and fitness seek to test themselves and measure their abilities against both themselves and fellow competitors, e.g., as a gauge of one's fitness or improved progress. It would be useful to provide small and portable electronic devices that athletes could use for one or more purposes, for example: to provide performance measuring and feedback; to store collected data for display and/or later analysis; and to provide information and/or entertainment to the user. Further, it would be advantageous to provide easy, convenient, and lightweight activation and/or authentication systems for such electronic devices, e.g., to preserve battery life, to prevent measurement of data associated with undesired activity, and/or to prevent unauthorized use.

SUMMARY

Aspects of this invention relate to articles of clothing and/or pieces of athletic equipment that include one or more electronic modules. These modules may include electronic devices for performing various functions, such as modules and devices for providing RFID information or activating RFID systems; modules and devices for measuring, sensing, receiving, and/or transmitting data or information, such as data or information relating to various physical and/or physiological characteristics associated with activity taking place with a user wears the article of clothing and/or uses the piece of athletic equipment, identifying data or information, GPS information, and/or the like; etc. Aspects of the invention also relate to various systems and methods for activating and/or deactivating the module and/or electronic devices (e.g., sensing devices, transmission devices, receiving devices, etc.) included with or controlled by the module.

Additional aspects of the invention relate to various systems and methods for confirming whether the module and an article of clothing and/or a piece of athletic equipment to which it is attached are authorized for use with one another; systems and methods for data input to the module; and/or systems and methods for automatic data algorithm selection for use by the module. In at least some examples of this invention, physical or other interactions between the module and the article of clothing and/or the piece of athletic equipment with which it is engaged (and/or an absence of and/or change in such interactions) may be used for activating and/or deactivating the module and/or electronic devices included with the module, for confirming whether the module and clothing and/or equipment are authorized for use with one another, and/or for automatic data algorithm selection. Systems and methods according to at least some more specific examples of this invention may utilize light sources and detectors and/or magnets and magnetic sensing systems, such as Hall sensor systems, to activate the various systems (e.g., the module or electronic devices included with the module) and/or to initiate various methods, optionally without the need for further independent user input or interaction. At least some examples of the invention utilize magnetic or light interactions between the module and the article of clothing and/or the piece of athletic equipment and/or changes in the interaction when the module and article of clothing and/or piece of athletic equipment are engaged such that no physical element actually crosses the border of or enters into the module to cause the interaction or the change in interaction. This feature allows the module to be constructed in a tough, waterproof, and/or durable manner.

BRIEF DESCRIPTION OF THE DRAWINGS

A more complete understanding of the present invention and at least some features and advantages thereof may be acquired by referring to the following description and the accompanying drawings, in which like reference numbers indicate like features throughout, and wherein.

DETAILED DESCRIPTION

In the following description of various examples of the present invention, reference is made to the accompanying drawings, which form a part hereof, and in which are shown by way of illustration various structures, embodiments, and examples in which aspects of the invention may be practiced.

It is to be understood that other embodiments may be utilized and structural and functional modifications may be made without departing from the scope of the present invention.

I. General Description of Aspects of the Invention

Figure 1:
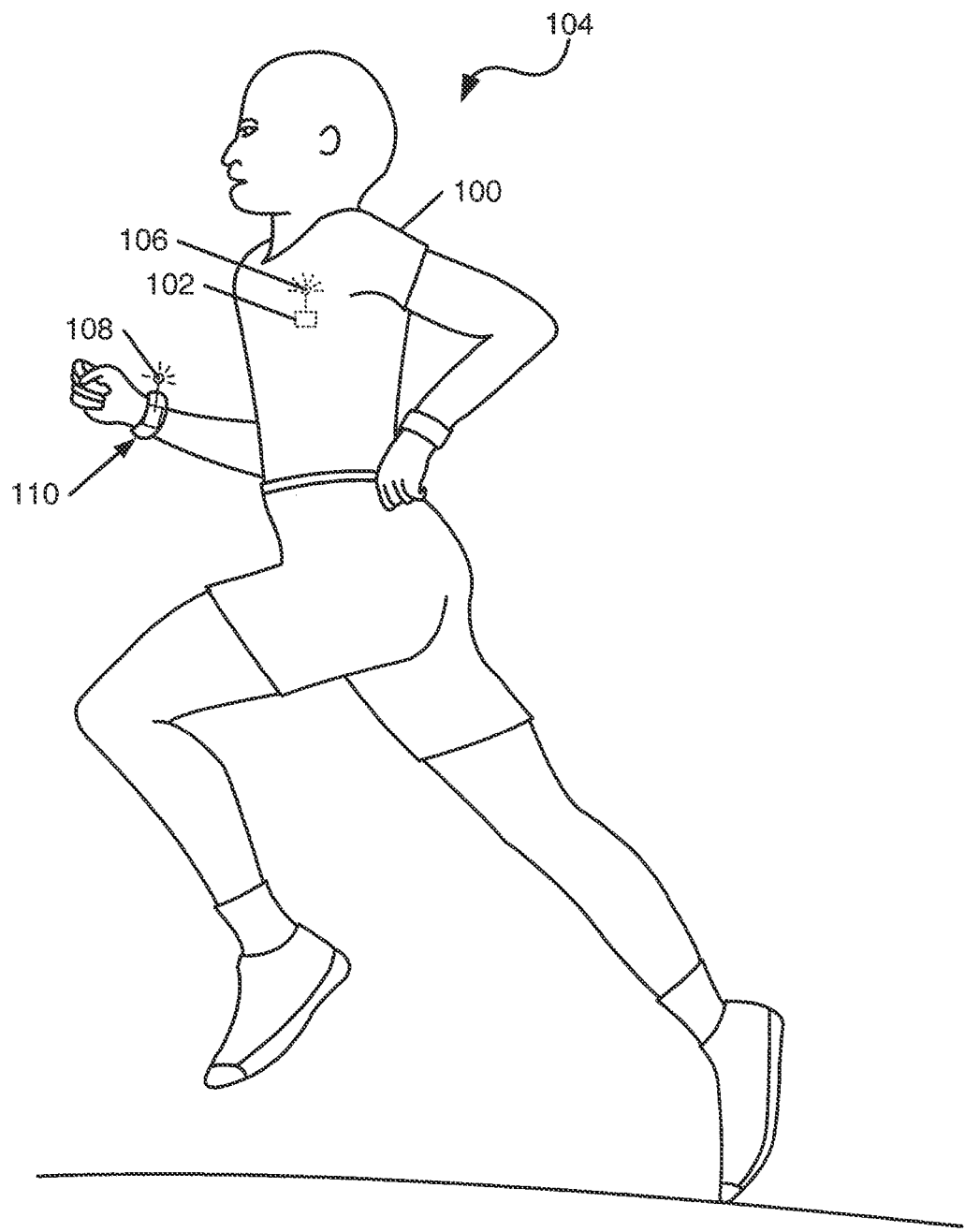
FIG. 1 illustrates an example system and environment in which aspects of this invention may be practiced.

Aspects of the present invention relate generally to articles of clothing and/or pieces of athletic equipment that include electronic modules. As shown in FIG. 1, which generally illustrates an example of the invention and an example environment in which aspects of the invention may be used, an article of clothing 100 (such as a torso covering garment, like a tee shirt, a jersey, or the like) may be equipped with one or more electronic modules for various purposes, such as performance measuring modules 102, other measuring modules 102, or modules 102 for other purposes (e.g., data transmission, data reception, RFID, radio or other audio/video transmission/reception, GPS transmission/reception, etc.). The modules 102 may include one or more electronic devices, e.g., for sensing or collecting information during a performance (e.g., during an athletic event or exercise or other performance), for providing information to the clothing or equipment user or others (e.g., transmission/reception devices, RFID devices, etc.), and/or for controlling another device (e.g., an auxiliary heating or cooling system, an impact-attenuating system, etc.). While any desired or suitable type(s) of information may be sensed, provided to the user or others, and/or otherwise used or generated, more specific examples of the types of information include: user traveling speed information; distance traveled information; GPS information; altitude information; user physical or physiological information (e.g., heart rate, pulse rate, blood pressure, body temperature, EKG information, EEG information, etc.); information derived from the GPS, speed, distance, altitude, physical, physiological, or other information (e.g., warning information, route information, geographical information, etc.); RFID generated information; and the like. Additionally or alternatively, the module 102 may be used to control other devices or functions and/or to provide data to other devices, including devices present as part of the article of clothing, on the user's person, carried by the user, or at other locations, such as heating or cooling devices, impact-attenuating devices, display devices, data receiving devices, devices carried on or included as part of the user's athletic equipment, etc.

As shown in the example of FIG. 1, as the user 104 moves, devices provided in the modules 102 mounted to or included in the article of clothing 100 will measure one or more physical or physiological characteristics associated with the motion and/or with the use of the clothing (e.g., like speed and distance information, GPS information, pulse rate, heart rate, blood pressure, EKG, and/or the type(s) of information described above), or perform other desired functions. If desired, the data may be stored in a memory (e.g., a memory included with the module 102, provided in the clothing 100, provided with a peripheral device, etc.), e.g., for later use and/or analysis, and/or it may be transmitted to the user or others, e.g., via wireless transmission devices 106 optionally included as part of the module 102 or the article of clothing 100. Optionally, if desired, the module 102 and/or the clothing 100 may include one or more microprocessors or other data processing capability to enable processing of the collected data before transmitting the data or other information to the user 104 or others, e.g., for display, storage, etc.

The data or desired information may be conveyed to the user 104 or others in any desired manner without departing from the invention, for example, to a wireless receiver 108 provided with a display device 110. Optionally, if desired, the display device 110 may be equipped with a microprocessor to enable initial processing of raw data sent by the module 102 or clothing 100, to enable further processing of data and/or information sent by the module 102 or clothing 100, etc. As more specific examples, the display device 110 may include various electronic devices, such as portable, user carried devices, e.g., a watch or wrist worn device (as illustrated in FIG. 1), a PDA type device, a cellular telephone, an MP3 or other audio player, a head worn display device, a pager type device, headphones or earphones, etc. Any type of "display device" also may be provided, such as audio devices, video devices, audio/video devices, alpha-numeric displays, etc.

In a similar manner, as will be described in more detail later in this specification, similar electronic modules 102 may be provided for use with pieces of athletic equipment. Such devices may be used to collect and/or provide data to the user (e.g., physical data associated with use of the piece of athletic equipment, etc.), to provide audio or video information to the user, etc.

In light of these general examples and the general description of example environments of use, various example aspects of the invention will be described in more detail below, including various example features relating to: the manner in which an electronic module may be engaged with an article of clothing or piece of athletic equipment, the manner in which the module and/or electronic devices included with it may be activated and/or its use authenticated, the manner in which data processing algorithms may be selected, the manner in which input data may be entered, and/or the like.

A. Automatic ON/OFF

One aspect of this invention relates to clothing and/or athletic equipment systems including electronic devices, such as devices that provide information to the user or others, e.g., physical or physiological information associated with use of the article of clothing or equipment and/or associated with the user's performance while wearing the article of clothing or using the equipment. In accordance with at least some examples of this invention, a clothing or athletic equipment system may include: (a) an article of clothing or a piece of athletic equipment having a module securing element; (b) a module removably engaged with the module securing element, wherein the module includes an electronic device (e.g., a sensing element that senses at least one physical or physiological characteristic associated with use of the article of clothing or the piece of athletic equipment (e.g., speed and/or distance information, jump height information, GPS information, altitude information, user physical or physiological information, gaming information, swing speed information, ball speed information, etc.)); and (c) an activation system that senses whether the module is engaged with the module securing element and activates the module or at least a first function of the module (e.g., the electronic device or some portion or function thereof, etc.) when the module is determined to be engaged with the module securing element. If desired, at least a first portion of the activation system may be included with and/or as part of the article of clothing or piece of athletic equipment, and a second portion of the activation system may be included with and/or as part of the module. The first portion of the activation system may be provided in or on the article of clothing or piece of athletic equipment in a position such that it is located proximate to the module securing element at least when the article of clothing or piece of athletic equipment is in use.

In at least some examples of the invention, the module, or at least some functions of the module, may be initiated or enabled automatically, for example, whenever the module is engaged at the module securing element and/or whenever the module is detected as being located at the module securing element. Determination as to whether the module is located at the module securing element and/or detection of the module at the module securing element may take place in any suitable or desired manner without departing from the invention. For example, the activation system may include a magnetic sensor system, a piezoelectric system, an accelerometer, a light sensor, or the like that produces an output when the module is included at or engaged with the module securing element. When the activation system includes a magnetic sensor, such as a Hall sensor system, a first portion of the magnetic sensor system (e.g., a magnet, a magnetic sensor, etc.) may be included with the article of clothing or piece of athletic equipment, and a second portion of the magnetic sensor system (e.g., a magnetic sensor, a magnet, etc.) may be included with the module. In other examples, if desired, either of the module or the article of clothing or the piece of athletic equipment may include both the source and the sensor, but changes in the sensed magnetic characteristics or an interrupted light beam may be sensed when the module is engaged with the module securing element. In at least some examples of such systems, if the article of clothing or piece of athletic equipment and the module do not each include the corresponding parts of the activation system and/or do not induce a predetermined interaction or change in the sensed characteristic(s), the module will not be activated and/or will be disabled and/or various functions of the module will not be activated and/or will be disabled. Examples of activation of the module and/or functions of the module will be described in more detail below in connection with various figures.

The module may be secured to the article of clothing or piece of athletic equipment in any desired manner without departing from this invention, e.g., the module securing element may take on any desired form without departing from the invention. In at least some examples of this invention, the module will be releasably secured to the article of clothing or piece of athletic equipment, e.g., such that it can be readily removed therefrom, if desired. As some more specific examples, the module securing element may take the form of a pocket, groove, or slot, formed in or on the article of clothing or piece of athletic equipment into which the module may be received. The module also may be held to the article of clothing or piece of athletic equipment in any desired manner without departing from the invention, such as via mechanical connectors, such as straps, flaps, hook-and-loop type fasteners, snaps, hooks, clasps, clamps, other mechanical fasteners, retaining walls or elements, tension fittings, detents, spring loading, etc.

In at least some examples of the invention, the module, or at least some functions of the module, may be initiated or enabled automatically, for example, whenever the module is engaged at the module securing element and/or whenever the module is detected at the module securing element. In accordance with other aspects of the invention, however, activation of the module and/or various functions of the module may be somewhat more selective. Another example aspect of this invention relates to a clothing or athletic equipment system that includes: (a) an article of clothing or piece of athletic equipment having a module securing element; (b) a module removably engaged with the module securing element, wherein the module includes an electronic device (e.g., a sensing element that senses at least one physical or physiological characteristic associated with use of the article of clothing or piece of athletic equipment); and (c) an activation system that senses whether the module is engaged with the module securing element in a first orientation and activates the module or at least a first function of the module (e.g., the electronic device or some portion or function of the electronic device, etc.) when the module is determined to be engaged with the module securing element in the first orientation. In at least some examples of such systems, if the module is engaged with the module securing element in a manner other than in the first orientation (e.g., other than in a predetermined activation orientation), the module may be shut off, deactivated, disabled, not turned on, and/or not activated and/or various functions of the module may be shut off, deactivated, disabled, not turned on, and/or not activated.

These example features of the invention may be used to easily switch the module and/or various functions of the module on and off. As some more specific examples, when the module is engaged with the module securing element in the first orientation, this will turn the module on and/or activate various functions of the module. Removing the module from the module securing element, flipping it over, rotating it, and/or the like, and then re-engaging it with the module securing element may be detected, e.g., by a magnetic sensor or other detector systems as described above, and these changes will place the module at an orientation other than the predetermined activation orientation. In response to these orientation changes (and/or whenever the module is engaged with a module securing element in an orientation other than the predetermined activation orientation), the module may be shut off and/or various functions of the module may be shut off, disabled, etc. This example feature may be used to extend battery life; to shut down module transmission/reception capabilities (if any) for airline travel, hospital use, and/or use at other transmission/reception sensitive localities; etc. In at least some examples of such systems, if the article of clothing or piece of athletic equipment and the module do not each include the corresponding parts of the activation system and/or do not otherwise induce an expected interaction and/or change in detected interaction, the module will not be activated and/or will be disabled and/or various functions of the module will not be activated and/or will be disabled.

As described above, various portions of the activation system may be included with the article of clothing or piece of athletic equipment and/or the module, and the various types of activation systems, sensor systems, securing elements, securing methods, etc. as described above may be used without departing from this aspect of the invention. Also, various arrangements of the portions of the systems included with clothing or athletic equipment (e.g., the module, activation system, sensing elements, etc.), for example, as described above, may be used without departing from this aspect of the invention.

Additional aspects of the invention relate to methods of activating an electronic module, e.g., for collecting physical or physiological data, e.g., during exercise, workouts, athletic performances, use of athletic equipment, etc. Such methods may include, for example: (a) engaging an electronic module with a module securing element provided in or on an article of clothing or piece of athletic equipment (e.g., optionally in a readily releasable manner), wherein the module includes an electronic device (e.g., a sensing element that senses at least one physical or physiological characteristic associated with use of the article of clothing or piece of athletic equipment); and (b) automatically activating the module or at least a first function of the module in response to the engaging. Optionally, as part of the activation procedure, activation will occur if and only if the module is oriented with respect to the module securing element in a predetermined activation orientation.

In such methods, as described above, an activation system may be associated with at least one of the module and/or the article of clothing or piece of athletic equipment, and this activation system may sense when the module is engaged at the module securing element and/or whether the module is oriented at the predetermined activation oriented. The module may be turned on and/or activated and/or various functions of the module may be turned on and/or activated when the module is engaged with the module securing element (optionally when engaged in the proper activation orientation). If the module is not engaged with the module securing element, if it is removed from the module securing element, and/or if it is oriented with respect to the module securing element in a manner other than in the predetermined activation orientation, the module may be turned off or deactivated and/or various functions of the module may be turned off or deactivated (optionally after a predetermined time period has elapsed).

In methods according to at least some examples of the invention, the various portions of the activation system may be included with the article of clothing or piece of athletic equipment and/or with the module, and the various types of activation systems, sensor systems, securing elements, securing methods, etc. as described above may be used. Also, various arrangements of the elements (e.g., the module, activation system, sensing elements, etc.), like those described above, may be used for practicing these example method aspects in accordance with the invention. Also, if desired, reorienting the module with respect to the module securing element (e.g., flipping it over, rotating it, etc.) may be used to turn off or deactivate the module and/or various functions of the module, in accordance with at least some example methods of the invention.

B. Authentication Features

Additional aspects of this invention relate to clothing or athletic equipment systems that include some type of authentication system before a module associated therewith will operate. In this manner, the module will not operate with any article of clothing or piece of athletic equipment, but rather, only with those that meet predetermined authentication requirements. Such clothing or athletic equipment systems may include, for example: (a) an article of clothing or piece of athletic equipment having a module securing element; (b) a module removably engaged with the module securing element, wherein the module includes an electronic device (e.g., a sensing element that senses at least one physical or physiological characteristic associated with use of the article of clothing or piece of athletic equipment); and (c) an authentication system that determines whether the article of clothing or piece of athletic equipment and the module are authorized for operation with one another. Once activated, the module or electronic devices included with the module may perform any desired function, such as radio or other audio/video communication functions, data transmission and/or reception functions, physical and/or physiological performance measuring and/or monitoring functions (e.g., speed and/or distance sensing, jump height sensing, heart or pulse rate sensing, blood pressure sensing, etc.), GPS information providing functions, altitude measuring functions, impact-attenuation control functions, RFID or other data transmission and/or reception functions, heating or cooling functions, etc.

Any type of authentication system may be used without departing from the invention. For example, in at least some examples of this aspect of the invention, a first portion of the authentication system may be included with the article of clothing or piece of athletic equipment and a second portion of the authentication system may be included with the module. As some even more specific examples, at least some of the systems described in the section above may be considered as providing a basic authentication system. For example, as described above, some example systems may require the module to be oriented in a predetermined manner with respect to the module securing element before the module will operate and/or before it will provide the desired data. In other examples, the module and the article of clothing or piece of athletic equipment both must contain a portion of the activation system and/or otherwise cause a predetermined interaction or change in a sensed condition before the module and/or at least some of its functions are activated. Therefore, in these examples, the module will not work with any piece of clothing or athletic equipment, but only with clothing and athletic equipment that includes at least a corresponding portion of the required activation (or authentication) system and/or only with clothing or athletic equipment that will cause a predetermined interaction and/or change in a sensed interaction or parameter.

Various types of systems may be used for authentication without departing from the invention, such as magnetic sensor systems, piezoelectric sensor systems, accelerometers, light (or other radiation) sensor systems, and the like. As more specific examples, a first portion of a light or magnetic sensor system (e.g., a magnet, a magnetic sensor, a light source, a light detector, etc.) may be included with the article of clothing or piece of athletic equipment and a second complementary portion of the sensor system (e.g., a magnetic sensor, a magnet, a light sensor, a light source, etc.) may be included with the module, and/or a specific orientation between these elements may be required before the module will be turned on, activated, and/or enabled for use. As additional examples, magnetic pole orientation, magnetic field strength at the magnetic sensor (e.g., at least a threshold strength, strength within a predetermined range, etc.), magnetic field direction at the magnetic sensor, detected light wavelength, detected light pattern, detected light direction, detected light intensity, and the like may be used as part of the information necessary to authenticate the module/clothing or module/athletic equipment combination (e.g., to determine whether the article of clothing or piece of athletic equipment and the module are authorized for operation with one another). As still additional examples, the article of clothing or piece of athletic equipment or the module may include multiple magnets or light sources, and overall magnetic pole orientation information, magnet location information, composite magnetic field strength at the magnetic sensor(s) (e.g., at least a composite threshold strength, a composite strength within a predetermined range, etc.), composite magnetic field direction at the magnetic sensor(s), detected light wavelengths, patterns, directions, intensities, and the like may be used as part of the information necessary to authenticate the module/clothing or module/athletic equipment combination (e.g., to determine whether the article of clothing or piece of athletic equipment and the module are authorized for operation with one another). Combinations of various different types of authentication systems also may be used without departing from this invention.

Additional aspects of this invention relate to methods for activating electronic modules (e.g., for collecting physical or physiological data, for example, during exercise, workouts, athletic performances, use of athletic equipment, or for other functions or purposes) that include authenticating steps and/or the use of authenticating systems. Such methods may include, for example: (a) engaging a module with a module securing element provided in or on an article of clothing or piece of athletic equipment, wherein the module includes an electronic device (e.g., a sensing element that senses at least one physical or physiological characteristic associated with use of the article of clothing or piece of athletic equipment); (b) determining whether the module and the article of clothing or piece of athletic equipment are authorized for operation with one another; and (c) activating the module or at least a first function of the module when the module and the article of clothing or piece of athletic equipment are determined to be authorized for operation with one another. Of course, the modules and/or at least some functions of the modules (e.g., the electronic device or portions or functions thereof) may be turned off, left off, deactivated, disabled, remain deactivated, remain disabled, etc., when the module and article of clothing or piece of athletic equipment are determined to be unauthorized for use with one another and/or when the module is disengaged from the module securing element. Various ways of providing the authentication information may be used in these methods, e.g., including the use of one or more magnets and magnetic sensors, relative magnet/sensor positioning and orientation, magnetic field strength, magnetic field direction, one or more light sources and sensors, light patterns, light intensity, light wavelength, etc., as described above, without departing from this aspect of the invention.

C. Algorithm Selection Features

The interaction between the module and its activation system may be used for other purposes as well. For example, in accordance with at least some example aspects of the invention, features relating to the interaction between the module and its activation systems may be used to provide information as to what data processing algorithm should be used, for example, to process data sensed, collected, and/or generated by the sensor(s) included with the module. Clothing or athletic equipment systems in accordance with at least some of these example aspects of the invention may include: (a) an article of clothing or piece of athletic equipment including a module securing element; (b) a module activation system, wherein at least a portion of the module activation system is included with the article of clothing or piece of athletic equipment; and (c) a module removably engaged with the module securing element, wherein the module includes an electronic device (e.g., a sensing element that senses at least one physical or physiological characteristic associated with use of the article of clothing or piece of athletic equipment), and wherein an interaction between the module activation system and the module provides data processing algorithm selection information to the module.

Various ways of changing or controlling the interaction between the module and the module activation system may be used without departing from this invention. For example, if the module activation system includes a magnetic based sensor system, aspects of the interaction between the module and the module activation system may be changed or controlled, for example, by changing the orientation, position, location, magnetic field orientation, and/or pole orientation of one or more magnets with respect to the magnetic sensor element(s); by changing the strength of one or more of the magnets; etc. Different orientations, positions, locations, magnetic field orientations, magnetic pole orientations, strengths, composite magnetic field strengths, composite magnetic field orientations, and the like may be sensed by systems and methods in accordance with examples of this invention and used as information to control and/or select the data processing algorithm used when the data is collected. Of course, light sources and light sensors (or other detection systems) may be used and various different characteristics regarding the detected light (or other parameter) may be used to control and/or select a data processing algorithm for use. Combinations of various different sensors and/or sensed parameters also may be used without departing from this invention.

As even more specific examples, different orientations, positions, locations, magnetic field orientations, magnetic pole orientations, magnetic strengths, composite magnetic field strengths, composite magnetic field orientations, light positions, light wavelength, transmitted/reflected lights and/or patterns, light intensity, and the like may be sensed by systems and methods in accordance with examples of this invention and used to indicate, for example, the type of clothing or equipment with which the module is engaged, a location on an article of clothing or piece of athletic equipment at which the module is engaged, etc. Then, once the type of clothing or equipment or location on the clothing or equipment is determined, the module may be controlled (e.g., by a micro-processor) to initiate a specific type of data processing algorithm and/or to sense specific types of data or information associated with the indicated type of clothing or equipment or location on the clothing or equipment.

As still more specific examples, each article of clothing or piece of athletic equipment produced by a specific manufacturer may include a magnet or light source (or other element) as part of a module activation system, and different sensors included with the module may be activated, different data algorithms may be run, and/or different information may be presented to the user depending on the type of clothing or athletic equipment to which the module is engaged. For example, for basketball jerseys, the magnet may be arranged in the clothing with the north pole up or a light of wavelength A may be included in the jersey, and when this pole orientation or light wavelength is sensed by the appropriate sensor included with the module, the module may be controlled to collect jump height information, speed information or the like and to provide this information to the user's display (or others). On the other hand, for golf shirts, shorts, or pants, this same manufacturer may arrange the magnet to always be south pole up or to use a different wavelength light source. Therefore, when this other pole orientation or light wavelength is sensed by the sensor included with the module, the module may be controlled to generate pedometer-based speed and/or distance information and provide this information to the user's display (or others). A wide variety of different sensing elements and algorithms may be activated for use with a wide variety of different types of clothing or pieces of athletic equipment in this manner (e.g., by detecting various different activation conditions) without departing from this invention.

As additional more specific examples, an individual article of clothing or piece of athletic equipment produced by a specific manufacturer may include plural module securing elements (e.g., one high on a leg, one low on a leg, etc.). Different magnet arrangements or conditions (or light sources or other activation system elements or conditions) may be associated with each of these different module securing elements so as to enable the sensor system to determine the location on the article of clothing or piece of athletic equipment where the module is engaged (e.g., south pole up at the lower leg area, north pole up at the upper leg area, etc.). Optionally, each module securing element on the article of clothing or piece of athletic equipment may have its own independent, associated magnets or other module activation systems, or alternatively, if desired, portions of one activation system may be shared by more than one module securing element (e.g., by varying distance, direction, orientation, intensity, etc. at the various module securing element locations, etc.). Different sensors may be activated in the module, different data algorithms may be run, and/or different information may be presented to the user (or others) depending on which module securing element in the article of clothing or piece of athletic equipment is sensed as being utilized by the user.

Examples of this aspect of the invention also relate to methods for selecting data processing algorithms for activation, e.g., using systems with data algorithm selection capabilities like those described above. Such methods may include, for example: (a) engaging a module with a module securing element provided in or on an article of clothing or piece of athletic equipment, wherein the module includes an electronic device (e.g., a sensing element that senses at least one physical or physiological characteristic associated with use of the article of clothing or piece of athletic equipment); (b) determining a location in an article of clothing or piece of athletic equipment or a type of clothing or athletic equipment with which the module has been engaged; and (c) selecting and/or initiating a data processing algorithm based on the determined location or type of article of clothing or equipment. As described above, various features of a module activation system and/or its interaction with the module may be used to provide the clothing or equipment type or module location information in such methods, such as magnet or light source orientation, magnet or light source position, magnet or light source location, magnetic pole orientation, magnet or light strength or intensity, changes in detected conditions of a magnet or light source, etc.

D. Data Input Features

Still additional aspects of this invention relate to data input features for electronic modules, such as modules associated with physical or physiological performance monitoring systems, e.g., for use with articles of clothing or pieces of athletic equipment. Such systems may include, for example: (a) a housing; (b) a sensing element or other electronic module provided at least partially within or on the housing, e.g., for sensing information indicative of at least one physical or physiological characteristic associated with an athletic performance (e.g., speed and/or distance information, GPS information, altitude information, jump height information, user physical or physiological information, etc.); (c) a data input system provided at least partially within or on the housing for receiving input data, e.g., in a wireless manner; and (d) an article of clothing or piece of athletic equipment with which the housing is engaged (optionally in a readily removable manner). The data input system may be capable of receiving input data at least at times when the electronic module is not performing other functions, such as when a sensing element included with the electronic module is not sensing physical or physiological characteristics associated with the athletic performance (e.g., at a point of sale location, at a race or event registration location, while mounted in an article of clothing or piece of athletic equipment, etc.). The data input system, in accordance with at least some examples of this invention, may utilize the sensing element to receiving input data.

The data input system may receive input data in various ways without departing from the invention. In accordance with at least some examples of this invention, the data input system may receive input data, at least in part, in a wireless manner, for example, via electromagnetic pulses, via light pulses, etc. Such data input systems may be provided, for example, in any of the various clothing or athletic equipment systems and methods described above.

Still additional examples of this aspect of the invention relate to data handling methods, optionally using data input systems, e.g., like those described above. Such methods may include, for example: (a) providing a sensing element or other electronic device in or on a module (e.g., if desired, the sensing element or other electronic device may sense at least one physical or physiological characteristic associated with an athletic performance or perform other desired functions); and (b) inputting data into a memory provided in the module, wherein the inputting takes place in a wireless manner. The inputting may take place, for example, at least while the sensing element included with the electronic module is not sensing the physical or physiological characteristics associated with the athletic performance (e.g., at a point of sale location, at a race or event registration location, while mounted in an article of clothing or piece of athletic equipment, etc.). In at least some examples of this invention, the sensing element may be used for receiving the input data. Examples of methods in accordance with this aspect of the invention further may include engaging the module with an article of clothing or piece of athletic equipment (optionally in a readily removable manner). The data inputting may take place prior to engaging the module with the article of clothing or piece of athletic equipment, after the module has been engaged with the article of clothing or piece of athletic equipment at least one time, while the module is engaged with the article of clothing or piece of athletic equipment, and/or at any other desired time. The data also may be input via electromagnetic or light pulses, as described above.

E. Articles of Clothing or Pieces of Athletic Equipment

Still additional aspects of this invention relate to clothing and athletic equipment structures and methods for producing such clothing and athletic equipment structures for use in systems and methods like those described above. Clothing and athletic equipment structures in accordance with at least some examples of this invention may include: (a) a garment member or a piece of athletic equipment; (b) a first module securing element included with the garment member or piece of athletic equipment, wherein the first module securing element includes structure for removably engaging a module that includes at least one electronic device (e.g., a sensor for sensing at least one physical or physiological characteristic associated with use of the garment member or piece of athletic equipment); and (c) an interaction system included with the garment member or piece of athletic equipment, wherein the interaction system produces an interaction and interacts with a module when a module is present in the first module securing element. In accordance with at least some examples of this invention, at least a portion of the interaction system may be provided so as to be located proximate to the module securing element at least when the article of clothing or piece of athletic equipment is in use.

The interaction system provided in the article of clothing or piece of athletic equipment may include a magnet and/or a magnetic sensor, as described above. Of course, a wide variety of other interaction systems may be used without departing from the invention, such as a light or other radiation source, a light or radiation detector, a pressure producing element, a pressure sensor, an accelerometer, a contact member, etc. In at least some examples of the invention, the interaction system will induce a change in a measured parameter and/or otherwise induce an interaction or change in some property that may be detected by a sensor included with the module or the article of clothing or piece of equipment when the module is mounted at the module securing element.

Additionally, as described above, an article of clothing or piece of athletic equipment may include plural module securing elements and/or plural interaction systems without departing from the invention. If desired, each individual module securing element may have a separate interaction system, multiple module securing elements may share a single interaction system and/or a portion thereof, and/or all module securing elements on an individual article of clothing or piece of athletic equipment may share a single interaction system, etc., without departing from this invention. If desired, different sensors and/or data processing algorithms may be activated depending on the module securing element with which the module is engaged.

Methods in accordance with this example aspect of the invention include methods for producing an article of clothing or piece of athletic equipment with an interaction system, e.g., of the types described above. Such methods may include, for example: (a) providing a first module securing element in or on a garment member or a piece of athletic equipment, wherein the first module securing element includes structure for removably engaging a module with the garment member or the piece of athletic equipment; and (b) providing a first interaction system in or on the garment member or piece of athletic equipment, wherein the first interaction system operates, at least in part, to induce a change or interaction detectable at a module when a module is engaged with the first module securing element. Plural module securing elements and/or interaction systems may be provided, and different sensors and/or data processing algorithms may be activated for the different module securing elements, if desired, as described above.

II. Specific Examples of the Invention

While aspects of the invention generally have been described above, the following provides more detailed, specific examples of systems and methods in accordance with the invention. Those skilled in the art should understand, of course, that the following description constitutes descriptions of examples of the invention and should not be construed as limiting the invention in any way.

As described above, FIG. 1 generally illustrates an example of the invention and an example environment of use in which articles of clothing 100 (or pieces of athletic equipment) are equipped with performance measuring or other electronic modules 102. The modules 102 may include detectors or sensing devices for sensing or collecting information during a performance (e.g., during exercise, an athletic event, use of athletic equipment, or other performance activity). The modules 102 or the articles of clothing 100 (or pieces of athletic equipment) further may include processing capabilities, wiring, and/or transmission capabilities (e.g., wireless transmission device 106 and wireless receiver device 108, etc.) to provide information to the user 104. While any desired type(s) of information may be sensed and/or provided to the user 104, more specific examples of the types of information include: user traveling speed information; distance traveled information; GPS information; altitude information; jump height information; user physical or physiological information (e.g., pulse rate, heart rate, body temperature, blood pressure, EKG data, EEG data, etc.); information derived from the GPS, speed, distance, physical, physiological, or other information (e.g., warning information, route information, geographical information, etc.); impact force and/or direction; and the like. As further examples, rather than sensors, the electronic modules 102 may perform any desired function, such as transmission and/or reception of RFID, radio, audio, video, or other data or information. The data or information may be presented to the user 104 via a display device 110 (e.g., through a wireless receiver 108), such as a watch or wrist worn display device, a PDA type device, a cellular telephone, an MP3 or other audio player, a head worn display device, a pager type device, etc. Alternatively or additionally, if desired, the sensed information or other information may be used to change or control features of the clothing 100 (or pieces of athletic equipment) itself (e.g., to control heating and/or cooling aspects, to control features of impact-attenuation devices, etc.) or to change or control other devices, with or without providing the information to a user 104.

Figure 2:
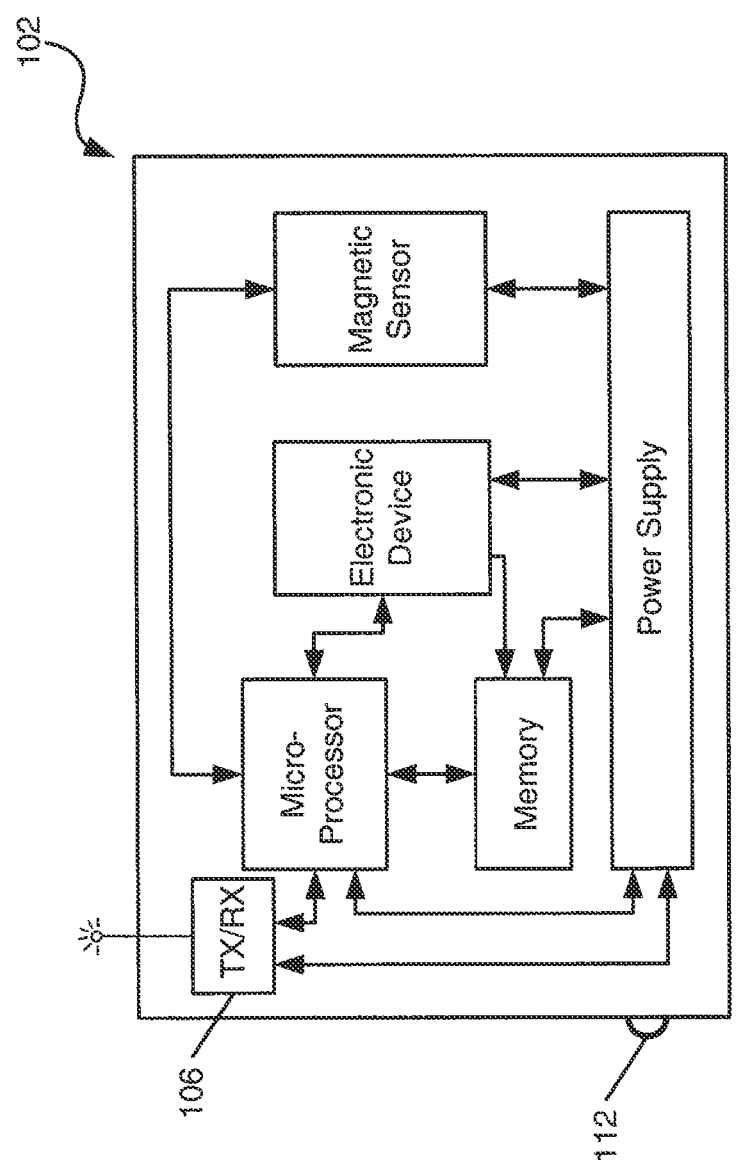
FIGS. 2 and 3 illustrate schematic diagrams of an example electronic module, display device, and overall system that may be used in practicing at least some example aspects of this invention.

FIG. 2 schematically illustrates example elements that may be included in a module 102 for use in an article of clothing 100, as shown in FIG. 1, and/or in pieces of athletic equipment (as will be described in more detail later in this specification). FIG. 2 generally shows that a module 102 may include a power supply, which may constitute one or more of a battery (e.g., a rechargeable battery, etc.), a solar cell, and/or another type of power supply. The power supply supplies power for operating other elements that may be included in the module 102, such as a magnetic sensor element that, as will be described in more detail below, may be used as part of an activation or authentication system in at least some examples of systems and methods in accordance with this invention. Of course, as noted above, other types of activation and authentication systems may be used without departing from this invention, such as light sources/sensors, piezoelectric elements, etc. The power supply also may provide power to other elements of the module, such as any electronic devices or sensors, the processing system, the data transmission system 106, the memory, etc.

The magnetic sensor may provide signal information to a processing system, e.g., one or more microprocessor devices, such as information indicating one or more characteristics of a magnetic field sensed by the magnetic sensor, such as magnetic field strength, magnetic field direction, magnet location, magnet polar orientation, number of magnet sources, positioning of magnetic sources, etc. When used as part of an authentication system, or even when used as part of an activation system, the microprocessor may process the incoming data from the magnetic sensor, determine whether the module 102 is located in an article of clothing or piece of athletic equipment and/or at a position or orientation suitable or authorized for use, and selectively operate one or more electronic devices (e.g., a sensing device, optionally included as part of the module 102, etc.) when appropriate to do so (e.g., turn on the electronic device, enable its operation, and/or activate it when the microprocessor determines that the module 102 is properly oriented and/or is authorized for use with the clothing or athletic equipment to which it was attached and/or turn the electronic device off, disable its operation, and/or deactivate it when the microprocessor determines that the module 102 is not properly oriented for use and/or is not authorized for use with the clothing or athletic equipment to which it was attached). The electronic device may sense, collect, and/or provide any desired type of information, such as physical or physiological data associated with use of the article of clothing or piece of athletic equipment, as noted above. Additionally or alternatively, the electronic device may transmit or receive data, audio signals, radio signals, video signals, transmit RFID information or other data; etc. Optionally, in at least some example systems, the magnetic sensor used for activation and/or authentication purposes also may function as a physical and/or physiological data sensing device, without departing from the invention (e.g., used as a Hall sensor element, used to provide pedometer based speed and/or distance information, used to provide impact-attenuation element control, etc.). One or more LEDs 112 (or other indicator(s)) may be used to indicate when the module 102 is properly oriented, turned on, receiving data, shutting down, etc.

A memory may be provided for storing data, e.g., the data collected by the electronic device. The collected (and optionally stored) data optionally may be subjected to further processing in the microprocessor and/or sent to a peripheral display device or other processing device as described above, e.g., via wireless transmission elements 106 provided with the module 102 in this example structure. Of course, any desired type of data transmission mechanism and system may be used without departing from the invention, including wired and wireless connections. Additionally or alternatively, if desired, data from the electronic device, or even data further processed by the microprocessor, may be sent to a peripheral device where further processing may take place and/or for display to the user (e.g., the display device 110 may operate in conjunction with a separate processing system that further processes the data, optionally after combining it or using it with other external data or information, before displaying information to the user, etc.). Any suitable or desired processing may take place aboard the module 102, the display device 110, and/or any other desired processing device (not shown) without departing from this invention.

Of course, FIG. 2 merely shows examples of some devices and elements that may be included on a module 102 for engaging with an article of clothing or piece of athletic equipment. One or more of the elements shown in FIG. 2 may be included as part of the clothing or athletic equipment structure rather than the module 102 without departing from the invention, such as the power supply, the memory, the microprocessor, the transmission system 106, at least portions of the magnetic sensor and/or the electronic devices, etc. When various elements are provided at locations other than the module 102, electrical connections and/or other communications with the module 102, if necessary, may take place in any desired manner, such as via wires, contact pads, contact pins, wireless connections, etc.

Figure 3:
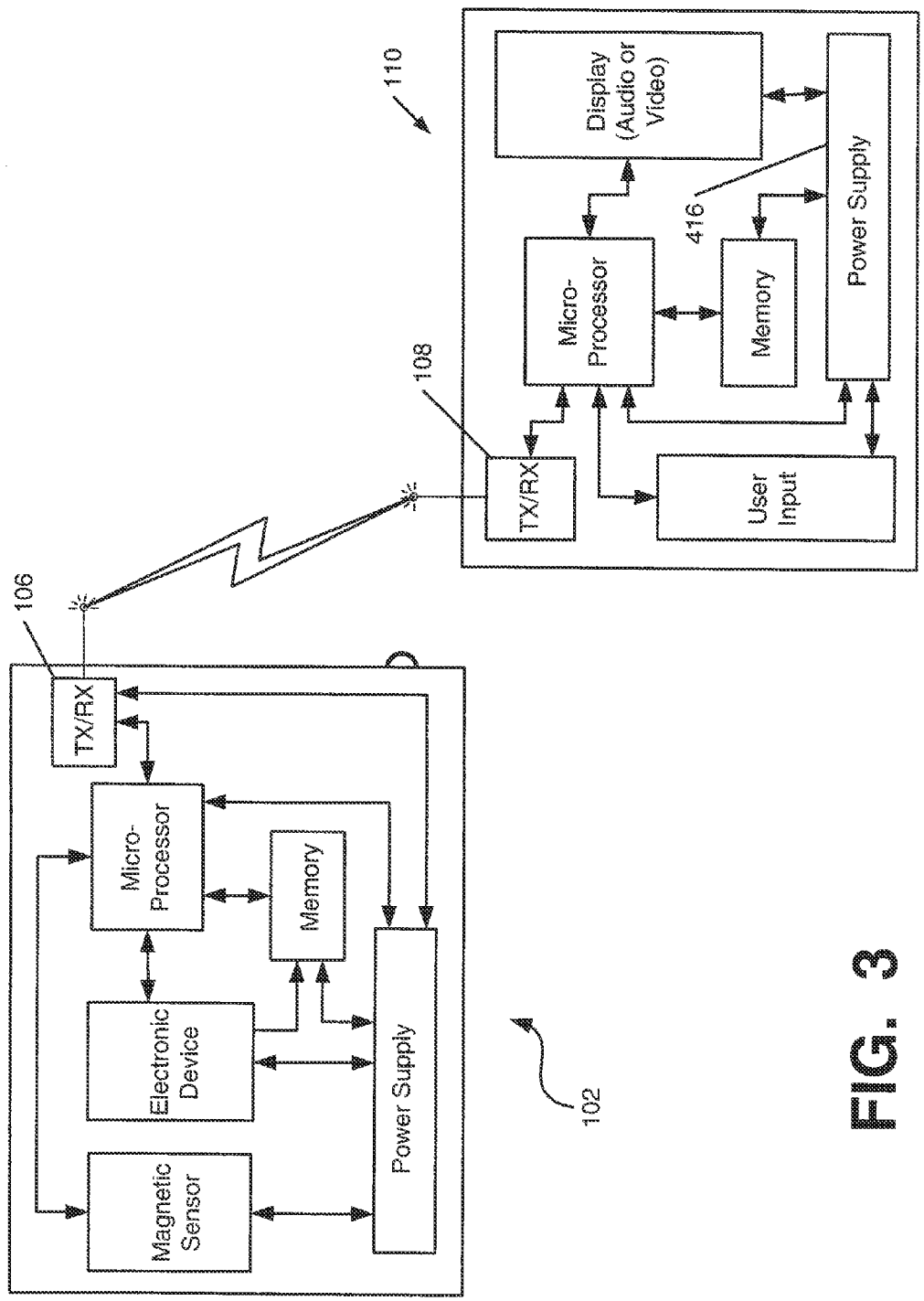

FIG. 3 illustrates a schematic diagram showing the interaction between the electronic module 102 and its corresponding display device, such as device 110 illustrated in FIG. 1. As shown in FIG. 3, the module 102 of FIG. 2 transmits the desired data to display device 110, in this example, via a wireless connection (e.g., from wireless transmitting device 106 on board module 102 to wireless receiving device 108 provided as part of the display device 110 in this example). Once received, a microprocessor provided with the display device 110 can further process the data, if necessary, and then provide signals to activate and/or control a display device (e.g., an audio, video, alphanumeric display, etc.) to display the desired information. As noted above, any desired type of information may be provided to the user, in any desired form or format, without departing from this invention. As further shown in FIG. 3, the display device 110 further may include one or more of the following: user input devices (such as buttons, keys, a digitizer and stylus, a mouse, etc.); a power supply; and a memory. If desired, aspects of this invention may be practiced with conventional display devices, such as watch or wrist worn display devices, PDA type devices, cellular telephones, MP3 or other audio players, head worn display devices, pager type devices, etc. Alternatively, if desired, the module 102 may provide data to a personal computer, server, or the like, e.g., to enable further processing of the collected data (e.g., post-event analysis of the data, storage and cataloging of collected data over multiple performances or events, etc.).

Figure 4:
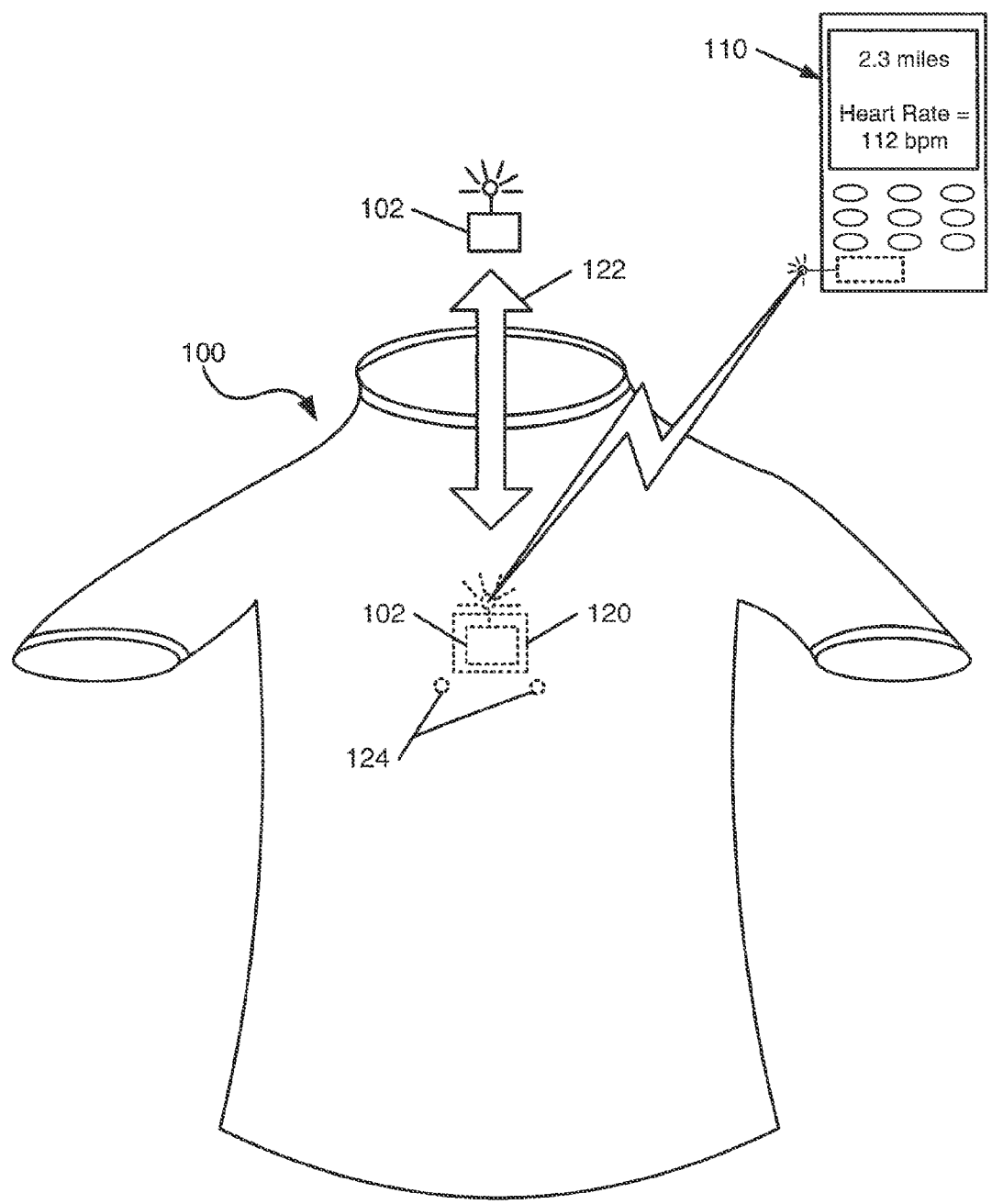
FIGS. 4, 5, and 6 illustrate examples of articles of apparel that may be used in practicing at least some example aspects of this invention.

FIG. 4 generally illustrates an example of an electronic module 102 secured to an article of clothing 100, such as a tee shirt or jersey type garment. As shown in FIG. 4, in this example structure 100, a front portion of the article of clothing 100 has a module securing element 120 defined therein for receiving and securing a module including an electronic device, e.g., an electronic device for measuring a physical or physiological characteristic associated with activity taking place during use of the article of clothing 100, e.g., modules 102 of the types illustrated in FIGS. 1-3. While the module securing element 120 may take on many different sizes, shapes, and forms without departing from the invention, in this example structure 100, the module securing element 120 takes the form of a pocket or pouch defined in or on the garment structure 100 into which the module 102 may be slid, as illustrated by arrow 122 in FIG. 4. If desired or necessary, the module securing element 120 may include an opening, connectors, or other structure so that at least a portion of the module 102 may be connected to the user's body and/or directly exposed to the user's skin, e.g., for providing physiological data, such as heart rate, blood pressure, body temperature, EKG data, or the like.

Once inserted into the module securing element 120, the module 102 may be further secured to the article of clothing 100, if necessary or desired. For example, if desired, the opening of the pocket 120 or pouch through which the module 102 is inserted may include an associated cover or flap structure that can be folded over to cover the opening and thereby secure the module 102 in the pocket 120 and to the article of clothing 100. The flap or cover may be further, secured, if necessary or desired, e.g., via magnetic engagement, hook-and-loop fasteners, snap fasteners, buckles, hooks, or other securing elements, to even more securely hold the module 102 in the pocket 120. Of course, other ways of securing the module 102 within the pocket 120 and/or to the article of clothing 100 may be used without departing from the invention, such as retaining walls and elements, detents, threaded arrangements, spring loaded arrangements, clamps, clasps, other mechanical connectors, adhesives, and the like. As still additional examples, if desired, structures may be provided in the pocket 120, garment 108, and/or on the module 102 to directly (and optionally releasably) attach these members to one another, such as in the manner in which memory cards are inserted into and attached within their respective slots (e.g., in digital cameras, recorders, etc.). Optionally, if desired, no cover or flap is necessary, e.g., if other structures involved can adequately hold the module 102 in place in the pocket 120 and/or on the garment 100, if protection of the module 102 from external debris and/or the elements is not an issue, etc.

FIG. 4 further illustrates example features of a clothing system that may be used to activate the module 102 and/or one or more functions of the module 102 (e.g., to activate physical and/or physiological data collection, sensing, detection, data transmission, etc.). Specifically, FIG. 4 illustrates that a portion of the clothing structure 100 may include one or more magnets 124 therein. When the module 102 including the magnetic sensor (see FIGS. 2-3) is inserted into the pocket 120 in this example structure 100, the magnetic sensor will sense the magnetic field generated by the magnet(s) 124, and the magnetic sensor on board the module 102 then can send a signal to the microprocessor on board the module 102, which can further send appropriate signals to activate various elements and/or functions of the module 102 (e.g., activate a sensing device or other electronic device, activate the transmission/reception system 106, activate an RFID system, etc.).

As another specific example, if desired, the magnet(s) 124 and the magnetic sensor on board the module 102 may constitute a Hall sensor system, which can detect relative motion between the magnet(s) 124 and the magnetic sensor on the module 102. Relative motion between the magnetic sensor on the module 102 and the magnet(s) 124 during insertion of the module 102 into the opening 130 may be detected, e.g., to initially power on the module 102 and/or to activate various functions of the module 102. In this manner, the module 102 can be automatically powered on immediately when it is inserted into the article of clothing 100 without the need for further action by the user and without the need for electrical contacts between the module 102 and the article of clothing 100. Alternatively, if desired, other steps may be involved in initially turning on the module 102 (e.g., user interaction with an ON/OFF switch, etc.).

If capable of detecting motion during each step and/or jump landing (e.g., if the module 102 were mounted in the leg portion of a pair of pants, in a sock, etc.), the magnetic sensor/magnet system also may be used as at least part of the physical and/or physiological sensing device, e.g., to provide pedometer type speed and/or distance information, jump height sensing information, etc.). As described above, data collected by the module 102 may be sent to a display device 110 or other processing system, e.g., via a wireless connection, for display to a user or another.

The example structure 100 shown in FIG. 4 has other potential useful functions and properties. For example, the magnet(s) 124 and the magnetic sensor on board the module 102 also may be used as an automatic shut-off element. More specifically, for example, if the magnetic sensor system does not detect motion for a predetermined period of time (e.g., no relative motion between the magnet(s) 124 and sensor on board the module 102 for 5 minutes, or the like), the microprocessor on board the module 102 (or other location) may be programmed and adapted to send a signal to shut down various devices and/or elements on the module 102, e.g., to conserve battery life. Of course, other types of detecting systems may be used to determine whether use of the article of clothing is continuing, such as motion detectors, light detectors (e.g., interrupted or moving light beams, etc.), accelerometers, and the like. If desired, the microprocessor also may be programmed and adapted to automatically shut down the module 102 and/or at least some functions of the module 102 when the module 102 is removed from the pocket 120, optionally after a predetermined time delay, e.g., in response to signals generated by the magnetic sensor system or other detection system.

Various ways of turning the module 102 and/or various functions of the module 102 on and off may be provided without departing from this invention. For example, the module 102 may be designed such that it can be turned on and/or operated when oriented in the article of clothing in a first orientation (e.g., in a "top up" orientation in this example, as shown in FIG. 4), e.g., using the magnetic sensor system or other desired "on/off" switching mechanism as described above. However, if the user removes the module 102 from the pocket 120 and reorients it in the pocket 120 in another manner not corresponding to its original "activation" orientation (a "top down" orientation, a rotated orientation, a flipped over orientation, etc.), this may provide an indicator to the microprocessor that the module 102, or at least some functions thereof, are to be turned off or deactivated. Switching magnetic pole orientations (e.g., north pole up to south pole up, etc.) also may be used to indicate reorientation of the module 102 (e.g., if the magnet is on board the module 102, etc.). In response to such reorientations of the module 102, the microprocessor then can send suitable signals to shut down the module 102 or various functions thereof (e.g., the LED 112 (see FIG. 2) may blink a few times to indicate that the module 102 is shutting down and then turn off when the shut down procedure is completed, etc.). This example feature gives users the ability to easily and selectively control the on/off functions of the module 102, e.g., to enable them to easily shut down the module 102 (or at least its transmission and/or reception capabilities or other capabilities) for airline travel, at hospitals, and/or at other locations where transmission and/or reception capabilities are banned or potentially dangerous, to conserve battery life, etc. Of course, any way of reorienting the module 102 may be used without departing from the invention. This feature provides for easy and convenient ON/OFF switching and also helps prevent the user from losing the module 102 (by allowing it to always be stored in pocket 120) and/or running down its power supply when its use is not necessary or desired. Alternatively or additionally, if desired, other ways of switching the module 102 on and off may be used without departing from the invention, such as by including an ON/OFF switch, disconnecting the module 102 from its power supply (e.g., breaking electrical connections if the power supply is independent from the module 102 (such as included as part of the article of clothing, piece of athletic equipment, etc.)), etc.

At least some of the various example systems described above in connection with FIGS. 1-4 may be considered as including basic "authentication systems" because in at least some of these systems both the article of clothing 100 and the module 102 have interacting elements and/or interact in some manner to activate the module 102 and/or at least some of the module's functions (e.g., the magnet(s) 124 in the article of clothing 100 and the magnetic sensor in the module 102, or vice versa). Of course, more sophisticated "authentication systems" may be provided without departing from this invention. For example, if desired, the magnetic sensor on the module 102 may be used to detect additional information regarding the magnetic field output by the magnet(s) 124, and the microprocessor on the module 102 may be programmed and adapted to activate the module 102 and/or various functions thereof if and only if the detected magnetic field information meets certain predetermined parameters or criteria. For example, if the magnetic sensor on board module 102 is capable of measuring or determining magnetic field strength, the module's microprocessor could be programmed and adapted to activate the module 102 and/or various functions of the module 102 if and only if the sensed magnetic field strength meets a certain threshold level and/or if and only if the sensed magnetic field strength falls within a certain range. In this manner, the module 102 could not be used with any type of clothing or any type of clothing with a simple magnet mounted therein, but rather only with articles of clothing that have an activation or authenticating system that matches the authentication parameters set in the module's microprocessor. Of course a wide variety of other parameters may be measured and compared against threshold values or predetermined authorized range values for activation and/or authentication purposes without departing from the invention, such as magnetic field orientation, magnetic field direction, magnetic pole orientation, numbers of magnets, distance between magnet(s) and the sensor, etc. Additionally or alternatively, other source and sensor combinations may be used without departing from the invention, such as light sources and light detectors, and the "authenticating" information may take the form of, for example, light beam direction, number of light sources, distance between light source and detector, light source wavelengths, a predetermined pattern of blocked and transmitted light (e.g., light blocked by the module and/or transmitted through the module, etc.), incident light angle, light reflection direction or characteristics, etc. Also, if desired, both the source and sensor (e.g., magnet, light, radiation, etc.) may be mounted on a single one of the module or the article of clothing, and interaction between the module and the article of clothing may be used to change the sensed information (e.g., by blocking light, by transmitting light, by blocking magnetic fields, by changing magnetic fields, by splitting light beams, by changing light beam directions, etc.). This information then may be used for authentication purposes.

Optionally, if desired, the authentication information necessary to activate and/or enable use of a module 102 with a specific article of clothing may be set by the manufacturer at the factory, by retailers at a point of sale location, by consumers at home, and/or at any other suitable or desired location in the supply chain and/or during use of the article of clothing.

Figure 5:
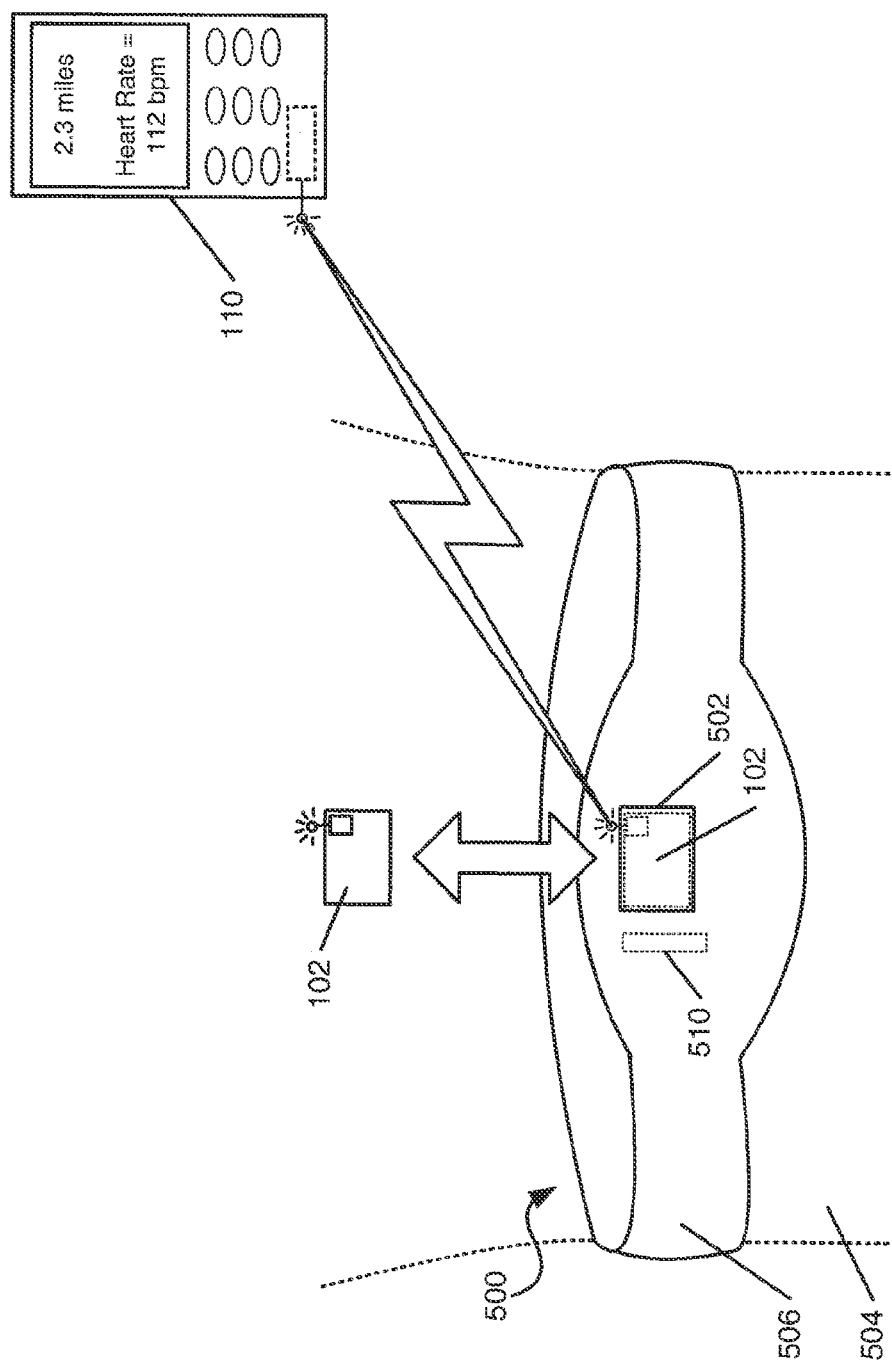

FIG. 5 illustrates another example article of clothing 500 with a module securing element 502 having a module 102 mounted therein in the general manner described above in conjunction with FIG. 4 (of course, any desired type of module securing element and module may be used without departing from the invention). In this example system, the article of clothing 500 forms a loop or ring, such as a belt, headband, sweatband, wrist band member, or the like, and this article of clothing 500 may be attached to any desired part of a user's body 504, such as an arm, wrist, head, leg, waist, chest, etc. The material 506 of the article of clothing 500 may be a soft and/or stretchable material, to allow a comfortable fit over a wide range of sizes, etc. Alternatively, if desired, the article of clothing 500 may be in an elongated strip form that produces a loop or ring using one or more fastener arrangements, such as buckles, hooks, snaps, hook-and-loop fasteners, clamps, clasps, adhesives, etc. Of course, any type of article of clothing 500 may be provided with one or more modules of the types described above without departing from the invention. Examples of articles of clothing include, but are not limited to: shirts, jerseys, tee shirts, tank tops, tube tops, pants, shorts, sweat pants, swimwear, leotards, sport specific clothing, belts, head bands, wrist bands, sweat bands, socks, undergarments, hats, visors, eyeglasses, jackets, coats, and the like. As shown in FIG. 5, the module 102 may be releasably engaged in the module securing element 502, e.g., in the manners described above, and it may provide signals to a display device 110 or other processing system, e.g., in the manners also described above.

In this illustrated example, a magnet 510 is arranged proximate to the module securing element 502, and this magnet 510 may be used in the manner described above for activating the module (e.g., an electronic device or sensing element included with the module), for maintaining the module in an active state while in use, for ON/OFF switching, for authentication, etc. Of course, any number of magnets or arrangement of magnets may be used without departing from this invention. The use of two (or more) magnets (e.g., as shown in the example structure of FIG. 4) can affect and increase the information available for activation and/or authentication purposes. For example, by controlling the strengths and/or arrangements of various magnets used for activation and/or authentication, a wide variety of different composite magnetic strengths measured at the magnetic sensor, composite magnetic field directions measured at the magnetic sensor, magnetic pole orientation(s), the number of magnets, magnet position(s) relative to the sensor, magnet positions relative to one another, and the like may be produced, and this information may be used for activation and/or authentication purposes. Again, the microprocessor included with the module (or at another appropriate location) can limit activation of the module (e.g., performance sensing elements (e.g., physical or physiological sensing characteristics associated with the physical performance and/or use of the article of clothing or piece of athletic equipment) or other electronic devices included in the module) to times when the module is located in a module securing element having magnets or other authenticating elements (e.g., light or other radiation sources, etc.) meeting predetermined thresholds, parameters, or characteristics.

Also, if desired, different types of sensors and a variety of different types of sensors in combination may be used for activation and/or authentication purposes without departing from the invention, such as a combination of a magnetic source and sensor element with a light source and sensor element, optionally with either or both of the sources having one or more characteristics that fall within a predetermined range or meet a predetermined threshold for authentication purposes. As can be readily understood from the above description, any number of sensors and any combination of types of different sensors may be used for authentication purposes without departing from this invention.

Figure 6:
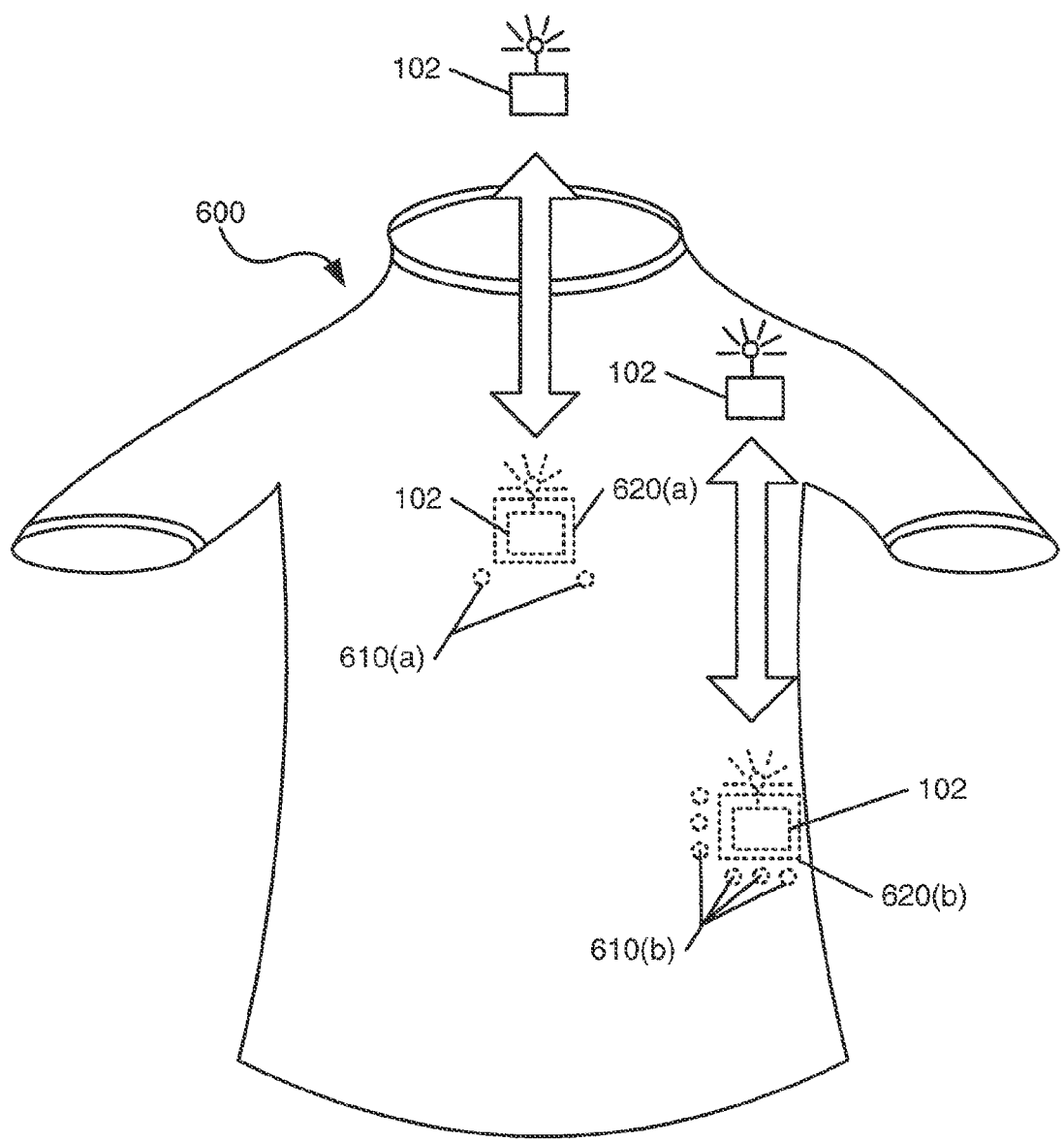

FIG. 6 illustrates additional example features that may be included in systems and methods in accordance with at least some examples of this invention. FIG. 6 shows an article of clothing 600 that includes at least one module 102, e.g., for measuring physical or physiological characteristics associated with use of the article of clothing 600 and/or the activities performed while wearing the article of clothing. In this example structure, the article of clothing 600 includes two independent module securing elements 620(a) and 620(b), one (620(a)) located in the mid-chest area of the jersey 600 as generally described above in connection with FIG. 4, one (620(b)) provided at the lower front side of the article of clothing 600). Separate activation/authentication systems 610(a) and 610(b) are provided in this example structure 600 for each module securing element 620(a) and 620(b), respectively. In this illustrated example, the activation/authentication systems 610(a) and 610(b) take the form of magnets that interact with magnetic sensors on board the module 102. However, as described above, various different types of activation systems and/or authentication systems may be provided, and various different parameters may be measured and used for authentication and activation purposes without departing from this invention.

If desired, a single activation/authentication system may be provided for use with all of the module securing elements on a given article of clothing or piece of athletic equipment without departing from this invention. As still another alternative, if desired, two or more module securing elements on a single article of clothing or piece of athletic equipment may share at least some portions of a single activation/authentication system (e.g., share a magnet, a light source, etc.) without departing from this invention.

The example article of clothing 600 of FIG. 6 also helps illustrate additional potential features that may be available in accordance with at least some examples of this invention. More specifically, by providing different types of and/or characteristics for the individual activation/authentication systems provided on an article of clothing 600, the processing system (optionally a microprocessor on board the module 102) can determine, based on the signals generated by the activation/authentication system, where the module 102 is located on the article of clothing 600. For example, magnets 610(a) associated with module securing element 620(a) may have a first composite strength, pole orientation, or other features with respect to the module 102 (and/or the magnetic sensor on board the module 102), while magnets 610(b) associated with module securing element 620(b) may have a different strength, pole orientation, or other feature with respect to the module 102. If the magnetic sensor (or other activation/authentication system element) provides this data to the microprocessor, the microprocessor can use this information to determine the specific module securing element (e.g., 620(*a*) or 620(*b*) in this example) at which the module 102 is located. As a still further option, if desired, the microprocessor can activate specific types of sensors and/or otherwise activate, initiate, or utilize specific types of data processing algorithms based on the determined module 102 location (e.g., module securing location 620(*a*) or 620(*b*)) within the article of clothing 600.

Some more specific examples follow. For example, the article of clothing 600 and/or module 102 may be designed and programmed such that the module 102 was designed to be placed in the chest area module securing element 620(*a*) for use during long distance running or jogging. This module 102 placement information (e.g., which may be determined based on detected magnetic strength, pole orientation, light beam interruption, light beam wavelength, etc.) may be used by the microprocessor, for example, to activate a GPS based sensor element and/or an EKG sensor element and/or a data processing algorithm to provide GPS-based speed, distance, elapsed time, altitude, EKG, heart rate, blood pressure, body temperature, and/or other desired information to the user (e.g., via wireless transmission to a display device as described above). On the other hand, the article of clothing 600 and/or module 102 may be designed and programmed such that the module 102 is placed in the lower side based module securing element 620(*b*) for use during walking or similar type exercise (e.g., when playing golf, walking along the beach, walking on a treadmill, etc.), and this placement information (e.g., based on magnetic strength, pole orientation, light beam interruption, light beam wavelength, etc.) may be used by the microprocessor, for example, to activate a pedometer based speed and distance monitoring systems and/or a data processing algorithm to provide pedometer based speed and distance information to the user (e.g., via wireless transmission to a display device as described above). Of course, other module securing element placements and information relating to other placements may be used to activate still other sensors and/or other data processing algorithms without departing from this invention (for example, to activate jump height sensors, speed sensors, accelerometers, etc., and/or to activate data processing algorithms to sense and/or use this type of data and/or send it to the user (e.g., via wireless transmission, etc.)).

Optionally, if desired, a user could use the article of clothing 600 with multiple modules 102 simultaneously mounted in the multiple module securing elements (e.g., 620(*a*), 620(*b*), etc.) without departing from the invention. In such a situation, the physical, physiological data, and/or other data produced by the sensing devices or other electronic devices associated with the modules 102 may be displayed to the user on one or more display devices in any desired manner, e.g., on individual display devices dedicated to each module 102, on a single display device according to a predetermined algorithm (e.g., in a repeated, changing manner), on a single display device based on user demand, etc. Alternatively, if desired, a clothing system 600 may be designed so as to permit operation of or with only one module 102 at a given time.

The above examples of selective electronic device activation and/or data processing algorithm selection may be extended to situations involving different types of articles of clothing and/or pieces of athletic equipment. A comparison of FIGS. 4 and 5 illustrates one example. A clothing manufacturer may design one type of clothing article with one type of activation/authentication characteristics and another type of clothing article with different activation/authentication characteristics. As more specific examples, a clothing manufacturer may produce all of its jerseys 400 for one sport to have an activation/authentication system with two magnets 124 (or other activation system) oriented at the bottom of the module 102 when mounted in the clothing 400, and these magnets 124 will produce a magnetic field having one set of characteristics (as shown in FIG. 4). This same manufacturer may produce all belt type articles of clothing 500 to have an activation/authentication system with one magnet 510 (or other activation system) having a different set of characteristics (e.g., as shown in FIG. 5). Of course, any of the various example characteristics described above may be used for activation and/or authentication purposes and/or for distinguishing one module securing element location from another without departing from the invention (e.g., magnetic field orientation, magnetic pole orientation, magnet location relative to the sensor, number of magnets, magnet locations relative to one another, light wavelength, light intensity, number of light sources, light transmission/reflection/blocking properties, light beam splitting properties, incident light angle, etc.). In this manner, simply by placing a module 102 within an article of clothing, the sensor on board the module 102 (or other appropriate location) can detect the activation/authentication information and characteristics, it can send the information to the microprocessor, and the microprocessor associated with the module 102 can determine the type of article of clothing (e.g., 400 or 500 in these examples) in which the module 102 is mounted. The type of article of clothing information also can be used by the microprocessor to determine which sensors or other electronic devices to activate and/or otherwise determine which data processing algorithm to run, e.g., in the manner described above in conjunction with FIG. 6 (e.g., collecting and displaying GPS based information for use with running clothing v. collecting and displaying pedometer based information for golf or other clothing v. collecting and displaying jump height information for basketball clothing v. collecting and displaying cycling oriented information v. running an algorithm, collecting, and displaying information for gaming purposes (e.g., electronic games, video games, games involving physical activities, etc.), etc.).

Figure 7:
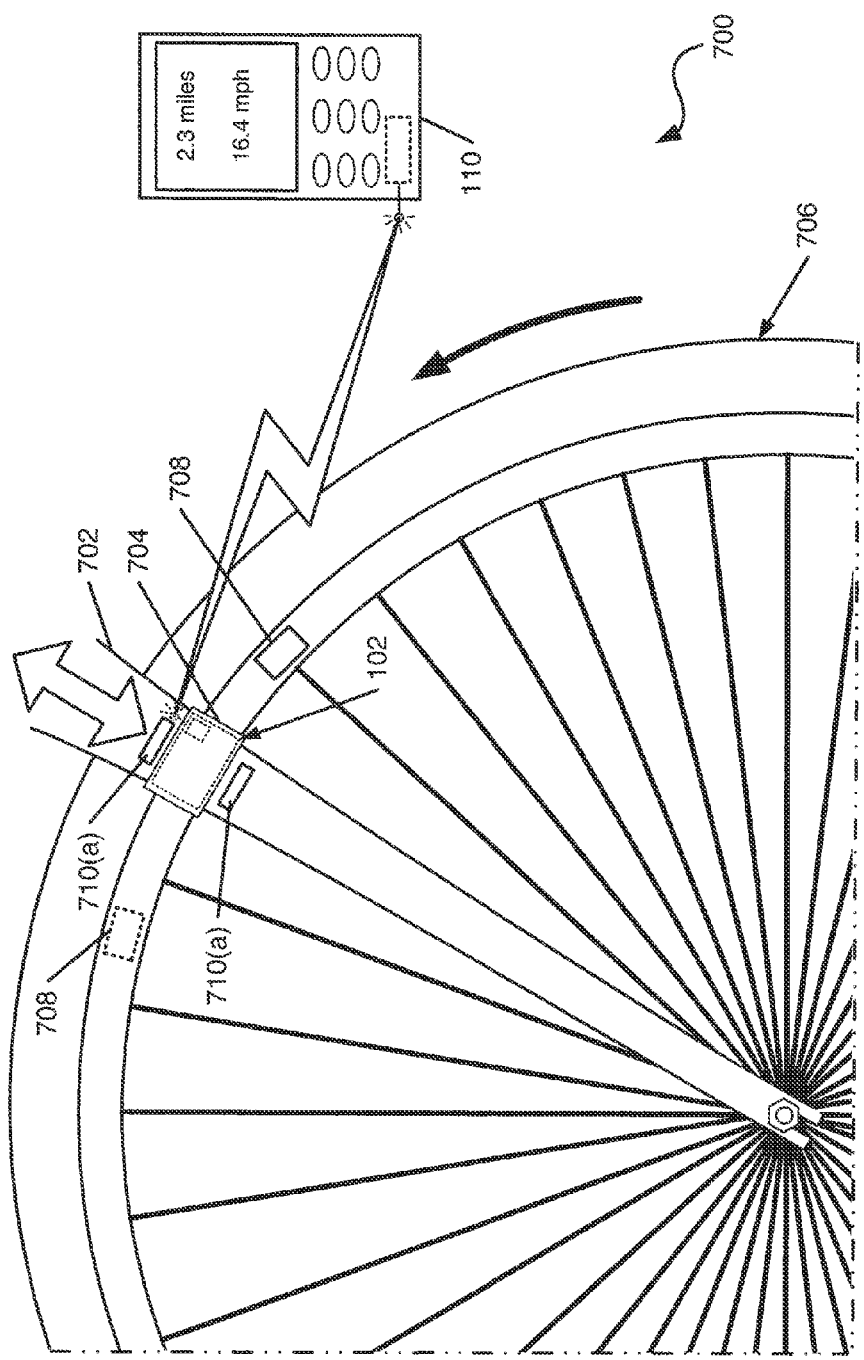
FIGS. 7 and 8 illustrate examples of pieces of athletic equipment that may be used in practicing at least some example aspects of this invention.

These aspects of the invention, however, are not limited to applications in which the module 102 is engaged with articles of clothing. Rather, modules 102 in accordance with at least some examples of this invention may be mounted to pieces of athletic equipment, and the same ON/OFF switching, activating, authenticating, location identifying, equipment type identifying, and/or data algorithm selection features may be applied to the athletic equipment. FIG. 7 illustrates an example system 700 in which an electronic module 102 may be mounted to a bicycle frame 702, e.g., to a receptacle 704 provided on the frame 702, via a clip or clamp element provided with the electronic module 102, via a fastener or connector structure, etc. As the bicycle wheel 706 turns, each turn may be detected by the module 102 (e.g., by detecting a magnet, reflecting member 708, or the like mounted on the wheel frame), and this revolution information, optionally combined with timing information, may be translated to speed and/or distance information and sent to a display device 110, e.g., via a wireless or other connection, in the manner described above. The display device 110 may be carried by the user as described above, located on the bicycle, located remotely, etc. Magnets 710(*a*) and 710(*b*) also mounted on the bicycle frame 702 in this example can be used for module ON/OFF switching, activation, authentication, and the like, as described above in conjunction with FIGS. 1-6. Optionally, if desired, element 708 may be used for ON/OFF switching, activation, authentication, and the like, optionally alone or in combination with elements 710(a) and/or 710(b).

Figure 8:
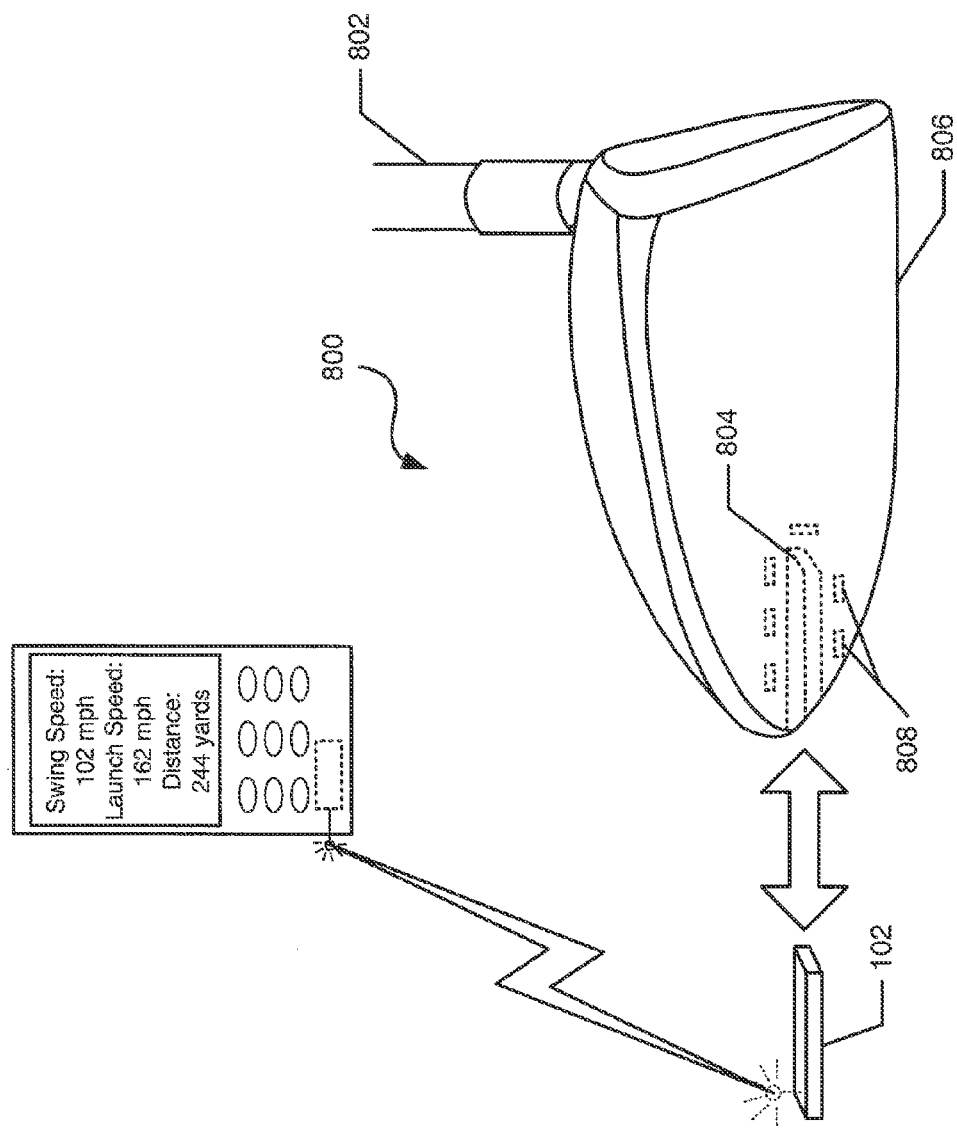

FIG. 8 illustrates another example piece of athletic equipment 800 that may be designed to work with an electronic module 102 of the types described above. In this example structure 800, the piece of athletic equipment is a golf club 802 that includes a slot 804 defined in the club head 806 for releasably receiving an electronic module 102. Any manner of securing the module 102 to the club head 806, shaft, etc., may be used without departing from the invention, including flaps, retaining walls or elements, detents, spring structures, clips, clamps, clasps, mechanical fasteners, adhesives, etc. If desired, the module 102 may be secured in the slot 804 in a releasable manner, e.g., in a manner similar to the way that PCMCIA cards or memory cards are mounted in electronic devices (e.g., in digital cameras, recorders, laptops, or the like). Of course, the module 102 also may be located at any desired position on the golf club 802 without departing from the invention.

The module 102 may include various sensors on board to detect a wide variety of data, such as club head speed, swing speed, initial ball launch velocity, ball rpm, ball spin data, swing plane, impact force or direction, and the like.

Also, as described above, a module activation/authentication system 808 may be provided, e.g., at least partially in or on the piece of athletic equipment (e.g., club head 806, in this example). Module activation/authentication system 808 may take the form of magnets and magnetic sensors, light sources and light sensors, etc., as described above, without departing from the invention.

Also, as apparent from a comparison of the module activation/authentication systems 710(a), 710(b), and 808 of FIGS. 7 and 8, the features of the authentication/activation system (e.g., different orientations, positions, locations, magnetic field orientations, magnetic pole orientations, magnetic strengths, composite magnetic field strengths, composite magnetic field orientations, light positions, light wavelength, transmitted/reflected lights and/or patterns, light intensity, and the like) may be sensed by systems and methods in accordance with examples of this invention and used to indicate, for example, the type of equipment with which the module 102 is engaged, a location on a piece of equipment at which the module is engaged, etc. Then, once the type of equipment or location on the equipment is determined, the module 102 may be controlled (e.g., by a microprocessor) to activate specific sensors and/or initiate specific types of data processing algorithms associated with the indicated type of equipment or location on the equipment, etc. Also, if desired, activation and/or authentication systems may be provided such that the same module 102 can be used in clothing or athletic equipment and different potential activation/authentication arrangements can be provided to allow the module to automatically determine whether it is located in clothing or equipment, the type of clothing or equipment, and/or location, and use this information for selective sensor and/or data processing algorithm activation.

Of course, aspects of this invention may be utilized to provide an electronic module (e.g., for sensing a variety of different physical characteristics, providing a variety of types of information, etc.) on a wide range of different types of athletic equipment. Examples of suitable types of equipment include, but are not limited to: golf clubs; golf club heads; bicycles and cycling equipment; stationary or other exercise bikes; skis, ski clothing, and ski equipment; skateboards and skateboarding equipment; baseball gloves and catcher's padding and equipment; hockey sticks, hockey padding, or other hockey equipment; rappelling or mountain climbing equipment; balls; lacrosse equipment; tennis equipment; football padding and equipment; athletic training equipment; canoeing or kayaking equipment; running equipment; soccer equipment; tennis equipment; boxing equipment; and the like. Examples of suitable parameters that may be measured include, but are not limited to: ball speed; ball spin; swing speed; cycling or other movement speed and/or distance; impact force and/or direction; user running speed and/or distance; GPS information; physical or physiological data associated with the activity; exerted force magnitude and/or direction; and the like.

Figure 9:
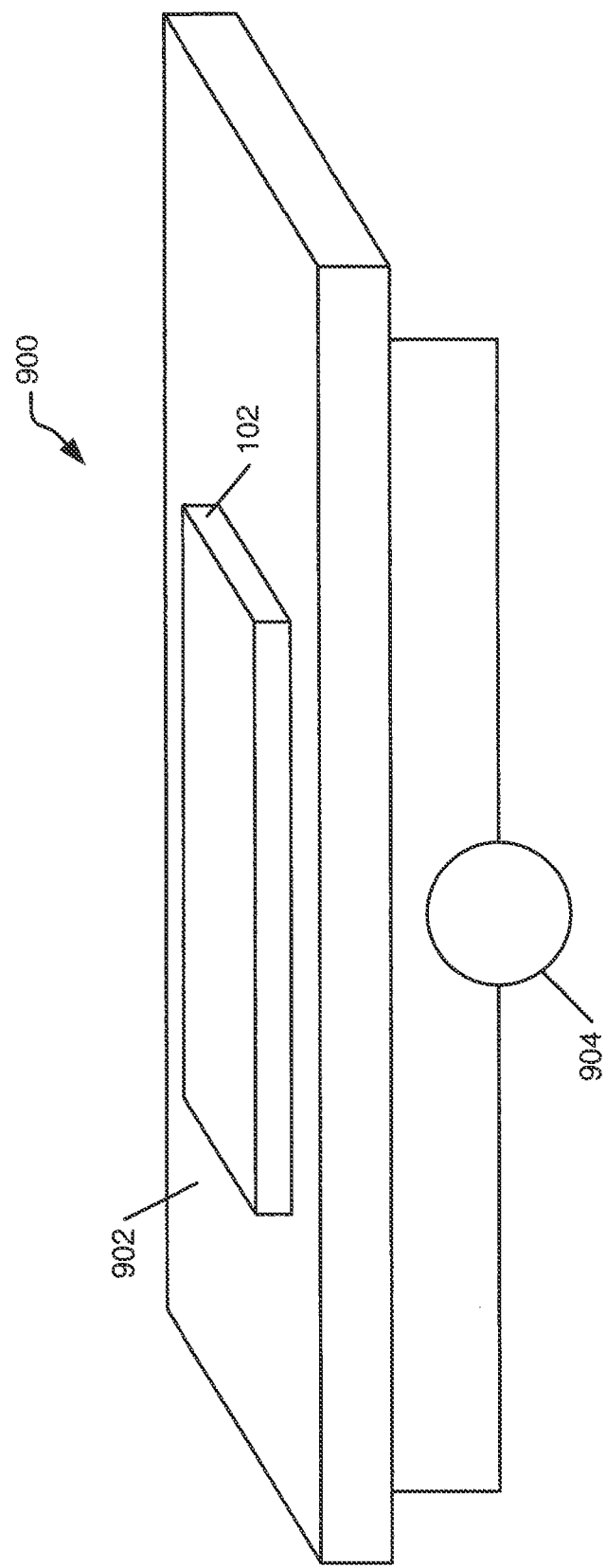
FIGS. 9 and 10 illustrate examples of data input systems and methods that may be used in accordance with at least some example aspects of this invention.

The module 102 as described above also may receive input data without departing from this invention (e.g., via a conventional wired or wireless connection, through the transmitter/receiving mechanism 106, if any, etc.). For example, the module 102 may receive information indicating the activating and/or authentication characteristics for which it is authorized for use, owner information, track or route information, etc. If desired, the magnetic sensor, light sensor, or other device on board the module 102 used for receiving information for activation and/or authentication purposes also may be used for receiving input data (e.g., for storage in the microprocessor, in a memory on board the module 102, in an external memory, etc.). FIG. 9 illustrates an example system 900 for inputting data into a module 102 (e.g., to its microprocessor registers, to an on board memory, etc.). The system 900 includes an electromagnet 902 and a device 904 that causes the electromagnet 902 to pulse on and off (or otherwise send pulsed signals, e.g., a coiled wire and an AC current source may be used, etc.). The electromagnetic pulses (controlled by device 904) may be used to activate the magnetic sensor on board the module 102 (see FIG. 2), which causes it to generate an output (as described above in connection with the example activation and authentication procedures). By controlling the pulses (e.g., no pulse=a logical 0 bit, a pulse=a logical 1 bit), input data can be generated and stored in the microprocessor, a memory, or other device on board the module. This feature could be used, for example, at a point of sale location (e.g., to input purchaser's identification information, activation/authentication information, and/or other desired information), at a race venue (e.g., to input the athlete's identification information, track or route information, etc.), at another point of use location (e.g., a gym, a spa, etc.), or the like. Of course, any desired data may be input in this manner, and any type of input source may be used (e.g., a pulsed light source and detector rather than magnetic source/sensor, etc.), etc., without departing from the invention.

Figure 10:
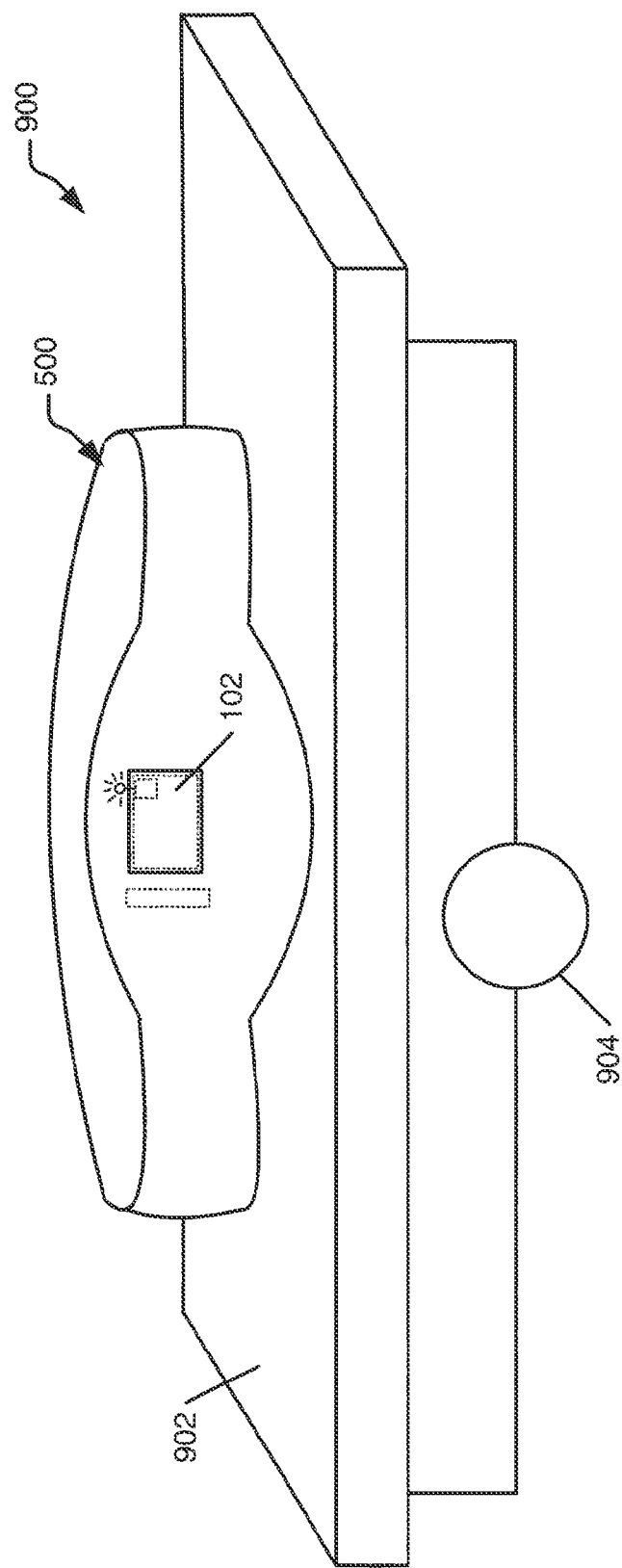

Moreover, as illustrated in FIG. 10, the module 102 need not be removed from the article of clothing 500 or piece of athletic equipment when receiving input data. Rather, as shown in FIG. 10, the module 102 may be engaged with an article of clothing 500 or piece of athletic equipment and still receive input data in the manner described above in conjunction with FIG. 9. In fact, the article of clothing or piece of athletic equipment 900 may be actually in the process of being worn or used by the user at the time at least some of the input data is transmitted via electromagnet 902 (or other input data source, such as a pulsed light source, etc.). Such systems may be particularly useful for inputting data and/or initiating some function of the module 102, for example, at race venues or other point of use or competition locations.

The data input systems and methods described above in conjunction with FIGS. 9 and 10 allow one to use an external pulsed magnet, light source, or other source to input data into the module 102. One advantage of this arrangement is that the data input system is contact free, does not use radio or IR input, and is simple to use. Also, it enables the module to be produced in a watertight, sealed manner, e.g., with no physical openings in the housing, if desired.

Data input in this manner may be used for a wide variety of purposes. One example enables users (or others) to set various "modes" of operation. As one example, rather than actually inputting data into a memory, the frequency of the incoming signal may be detected and used to set various modes of operation (e.g., a 10 Hz input places the module 102 in a "test" mode, 20 Hz places it in a "silent" or unactivated mode, 60 Hz places it in full operation mode (e.g., including FM data transmission to the display device, etc.), etc.). The "test mode" may be used, for example, at the factory, by placing the module in a test jig and testing its function(s) (e.g., running a predetermined battery of tests thereon, running diagnostics, etc.). At retail stores or other point of sales locations, the module 102 may be placed on an electromagnet as shown in FIGS. 9 and 10 and given data input (e.g., a specific predetermined frequency) to activate it for first time use once purchased (e.g., to zero out any mileage or information logged on the module and/or article of clothing or equipment from previous in-store try-ons, etc.). At athletic events, a user could stand or sit on an electromagnet mat (or other appropriate data input device), and input data could be used to place the module in a special "rewards mode" (e.g., prompting it to send out data indicating total mileage ran, total miles or hours spent using the equipment or clothing, total miles over a time period, etc., and the wearer could check her progress against previously designated goals and win prizes or rewards based on the logged mileage or time data, etc.). These methods of data input also may be used to place the module in various predetermined or special operational modes, such as pedometer mode, run mode, basketball jump height recording mode, game modes, etc., e.g., for specific uses.

Of course, a wide variety of different modes and uses may be provided based on input introduced, for example, by the systems and methods described in conjunction with FIGS. 9 and 10. As more specific examples, such systems and methods may be used: (a) to activate an "airline sleep mode" (e.g., to turn off the data transmission and/or reception capabilities, e.g., at a kiosk or other location in airports, etc., to turn off the module for predetermined time periods, etc.); (b) to place the module in a "game mode" to collect data used for video games, physical exercise games, or other games or reward programs, etc.; (c) to upgrade or add new firmware or software; (d) to activate a "power save mode," e.g., for shipping or other non-use time periods (e.g., very low power to save shelf life, etc.); (e) to reset the system (e.g., mileage counters, game scores, etc.); (f) to signal the module to output total mileage, logged hours, identification information, other desired information, etc.; (g) to input personal information (e.g., name, address, height, weight, running club, identification information, etc.); etc. One also could use data input systems like those shown in FIGS. 9 and/or 10, for example, for the following: (a) to provide "low power" or "anti-dead" operational override (to allow users to use up every bit of battery life and still obtain the stored information); (b) to set up "partner codes" at the manufacturer (e.g., to set the authentication parameters for use with the module, etc.); (c) to change the security keys used for data scrambling and encryption (if desired or used by the system); (d) to set performance limits (e.g., to indicate that the module typically will be used at slow speeds, etc.), which may be used to enable the module's detectors to work better at the slower end of a speed continuum and not optimize its settings for use at fast speeds or over a wide range of speeds; (e) to change receiver (e.g., radio, video, MP3 player, other display device) performance characteristics to match the user's model(s); (f) to change output or display change frequency (e.g., update or change the displayed information twice a second, once every ten seconds, etc.); (g) to change operational/power consumption modes (e.g., higher power to provide very high accuracy step counts or other data v. lower power, which may miss a few steps or data points (e.g., suitable when just walking around) but saves battery life; etc.). A wide range of other input also may be provided to the module 102, e.g., via the systems shown in FIGS. 9 and 10, without departing from this invention.

Many of the examples above describe interactions between a device mounted on an article of clothing or piece of athletic equipment and a device included with a module for activation/authentication purposes. The invention is not limited, however, to use in this specific environment or structural arrangement. Rather, if desired, both the source and the sensor may be included on only one member (e.g., both on the module or both on the article of clothing or piece of athletic equipment) and changes in the detected parameters when the module is inserted in the article of clothing or piece of athletic equipment (or otherwise interacts with the article of clothing or piece of athletic equipment) may be used for activation/authentication purposes. For example, changes in the detected magnetic field, light beam interruption, changes in light beam transmission/reflection/angle/intensity properties, physical interactions, and the like may be induced when a module is inserted into an article of clothing or piece of athletic equipment, and such changes may be used for activation/authentication purposes without departing from the invention.

Also, much of the description above relates to systems in which a magnet or other source is located on the article of clothing or piece of athletic equipment and is used for activation and/or authentication purposes. This is not a requirement in all examples of the invention. For example, if desired, the magnet or other activation/authentication initiator source may be provided on another device, such as on a watch, ring, bracelet, footwear, a peripheral device, and the like, and then this other device may be moved near the module in the article of clothing or piece of athletic equipment to initiate data collection (e.g., for activation and/or authentication purposes).

Additionally, much of the description and specific examples above relate to systems and methods in which the electronic module mounted in the article of clothing or piece of athletic equipment provides or senses information relating to the use of the article of clothing or piece of athletic equipment (e.g., physical or physiological data associated with use of the article of clothing or piece of athletic equipment). Systems and methods according to at least some examples of the invention are not limited to these types of uses. Rather, if desired, the electronic devices or modules may perform any desired function and/or sense or monitor any type of data without departing from this invention. Additional examples of potential functions or operations include, but are not limited to: data transmission and/or reception functions, enabling RFID transmission and/or reception functions, controlling other systems (e.g., an active impact-attenuation control system, etc.), controlling a radio or other audio/video transmission or display device, receiving radio transmissions (e.g., AM/FM radio, etc.), etc.

The same electronic modules used in articles of clothing and/or athletic equipment, as described above, also may be used in articles of footwear, e.g., as described in more detail in commonly owned U.S. patent application Ser. No. 11/166,351 filed Jun. 27, 2005. If desired, a single electronic module may be selectively and freely moved by the user, e.g., interchanged from one article to another (between articles of clothing, articles of footwear, and/or pieces of athletic equipment), to different locations on a given article, etc. The various activation and/or authentication systems described above, or their various different arrangements, may be used by the electronic module, for example, to inform the electronic module or the system(s) receiving data from the electronic module: (a) the type of article in which it is mounted (e.g., shoe, clothing or equipment; types of shoes, clothing or equipment; locations on shoes, clothing, or equipment, etc.), (b) the type of data or information to sense, collect, or use, and/or (c) the data algorithm to activate or use, etc. As another alternative, if desired, data exchanged between the electronic module and the article to which it is mounted (e.g., shoe, article of clothing, or piece of athletic equipment, etc.) may inform the electronic module or a system that accepts data therefrom as to the type of device in which it is mounted, the mounting location, the type of monitoring to conduct, the type of sensors to activate, the data processing algorithm to run, etc. As a more specific example, if desired, mounting the electronic module in a receptacle on an article of footwear, article of clothing, or piece of athletic equipment may trigger an RFID transmission (e.g., from the mounting device to the module) that informs as to the type of device on which the electronic module is mounted and/or its location on the device. This information may be used by the electronic module or systems that receive data therefrom for sensor activation purposes, for data monitoring selection purposes, for data processing algorithm selection purposes, etc. In this manner, a single electronic module can be used interchangeably for a wide variety of different purposes and/or on a wide variety of different articles or devices, including, for example, clothing, footwear, and athletic or other equipment, to measure a wide variety of different physical or physiological parameters.

III. Conclusion

While the invention has been described with respect to specific examples including presently preferred modes of carrying out the invention, those skilled in the art will appreciate that there are numerous variations and permutations of the above described systems and methods. For example various aspects of the invention may be used in different combinations and various different subcombinations of aspects of the invention may be used together in a single system or method without departing from the invention. Also, various method steps described above may be changed, changed in order, omitted, and/or additional steps may be added without departing from this invention. Thus, the invention should be construed broadly as set forth in the appended claims.

I claim:

1. An athletic equipment system, comprising:
   a piece of athletic equipment having a module securing element;
   a module removably engaged with the module securing element, wherein the module includes an electronic device; and
   an activation system that senses whether the module is engaged with the module securing element and activates at least a first function of the module when the module is determined to be engaged with the module securing element, wherein the first function of the module includes initiating selection of a data processing algorithm, wherein at least a first portion of the activation system is included with the piece if athletic equipment.

2. An athletic equipment system according to claim 1, wherein a first portion of the activation system is included with the piece of athletic equipment and a second portion of the activation system is included with the module.

3. An athletic equipment system according to claim 1, wherein the activation system includes a magnetic sensor system.

4. An athletic equipment system according to claim 1, wherein the module securing element includes a receptacle defined on or in the piece of athletic equipment for removably receiving the module.

5. An athletic equipment system according to claim 1, wherein the module includes a data input system for receiving input data in a wireless manner.

6. An athletic equipment system according to claim 1, wherein the electronic device includes a sensing element that senses at least one physical characteristic associated with use of the piece of athletic equipment.

7. An athletic equipment system according to claim 1, wherein the piece of athletic equipment is a bicycle.

8. An athletic equipment system, comprising:
   a piece of athletic equipment having a module securing element;
   a module removably engaged with the module securing element, wherein the module includes an electronic device; and
   an activation system that senses whether the module is engaged with the module securing element in a first orientation and activates the module or at least a first function of the module when the module is engaged with the module securing element in the first orientation, wherein the activation system further senses whether the module is engaged with the module securing element in a second orientation, and wherein the module or at least the first function of the module is deactivated when the module is engaged with the module securing element in the second orientation.

9. An athletic equipment system according to claim 8, wherein the module or the first function of the module is not activated or is deactivated when the module is not engaged with the module securing element in the first orientation.

10. An athletic equipment system according to claim 8, wherein the module securing element includes a receptacle defined on or in the piece of athletic equipment for removably receiving the module.

11. An athletic equipment system according to claim 8, wherein the electronic device includes a sensing element that senses at least one physical characteristic associated with use of the piece of athletic equipment.

12. An athletic equipment system according to claim 8, wherein the piece of athletic equipment is a bicycle.

13. An athletic equipment system, comprising:
   a piece of athletic equipment;
   a first module securing element included with the piece of athletic equipment, wherein the first module securing element includes structure for removably engaging a first module that includes a first electronic device; and
   a first interaction system included with the piece of athletic equipment, wherein the first interaction system interacts with the first module when present in the first module securing element to induce a change detectable at the first module and
   wherein the interaction between the first interaction system and the first module provides data processing algorithm selection information to the first module.

14. An athletic equipment system according to claim 13, wherein at least a portion of the first interaction system is located proximate to the first module securing element at least when the piece of athletic equipment is in use.

15. An athletic equipment system according to claim 13, wherein the first module securing element includes a receptacle defined in the piece of athletic equipment for receiving the first module.

16. An athletic equipment system according to claim 13, further comprising:
a second module securing element included with the piece of athletic equipment, wherein the second module securing element is independent of the first module securing element and includes structure for removably engaging a second module that includes a second electronic device.

17. An athletic equipment system according to claim 16, further comprising:
a second interaction system included with the piece of athletic equipment, wherein the second interaction system interacts with the second module when present in the second module securing element to induce a change detectable at the second module.

18. An athletic equipment system according to claim 13, wherein the first module is engaged with the first module securing element, and wherein the first electronic device includes a sensing element that senses at least one physical characteristic associated with use of the piece of athletic equipment.

19. An athletic equipment system according to claim 13, wherein the piece of athletic equipment is a bicycle.

20. A method of activating an electronic module, comprising:
engaging, in a first orientation, an electronic module with a module securing element provided in or on a piece of athletic equipment, wherein the module includes an electronic device;
automatically activating the module or at least a first function of the module in response to engaging the electronic module with the module securing element; and
deactivating at least a second function of the module in response to engaging the electronic module with the module securing element in a second orientation.

21. A method of activating an electronic module, comprising:
engaging an electronic module with a module securing element provided in or on a piece of athletic equipment at a first orientation, wherein the module includes an electronic device;
activating the module or at least a first function of the module when the first orientation corresponds to a predetermined activation orientation; and
activating at least a second function of the electronic module in response to engaging the electronic module with the module securing element in a second orientation.

22. A method for producing an athletic equipment system, comprising:
providing a first module securing element in or on a piece of athletic equipment, wherein the first module securing element includes structure for removably engaging a module with the piece of athletic equipment; and
providing a first interaction system in or on the piece of athletic equipment, wherein the first interaction system interacts with the module when the module is engaged with the first module securing element, wherein the interaction between the first interaction system and the module indicates at least one of: (i) a type of athletic equipment for which the module is engaged and (ii) a location on the athletic equipment for which the module is engaged.

23. A method according to claim 22, wherein the first module securing element includes a receptacle at least partially defined on or in the piece of athletic equipment.

24. A method according to claim 22, further comprising:
providing a second module securing element in or on the piece of athletic equipment, wherein the second module securing element is independent of the first module securing element and includes structure for removably engaging a module with the piece of athletic equipment.

25. A method according to claim 24, further comprising:
providing a second interaction system in or on the piece of athletic equipment, wherein the second interaction system operates, at least in part, to induce a change detectable at a module when a module is engaged with the second module securing element.

26. A method according to claim 22, further comprising engaging a module with the first module securing element, wherein the module includes an electronic device having a sensing element that senses at least one physical associated with use of the piece of athletic equipment.

27. A method according to claim 22, wherein the piece of athletic equipment is a bicycle.

* * * * *